United States Patent
Sasaki et al.

(10) Patent No.: US 9,269,395 B2
(45) Date of Patent: Feb. 23, 2016

(54) DISPLAY CONTROL APPARATUS, DISPLAY APPARATUS, AND METHOD FOR CONTROLLING THE SAME

(71) Applicant: CANON KABUSHIKI KAISHA, Tokyo (JP)

(72) Inventors: Masatsugu Sasaki, Yokohama (JP); Takashi Yamamoto, Yamato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 13/957,839

(22) Filed: Aug. 2, 2013

(65) Prior Publication Data
US 2014/0044421 A1    Feb. 13, 2014

(30) Foreign Application Priority Data

Aug. 10, 2012 (JP) ................................. 2012-178637
Aug. 10, 2012 (JP) ................................. 2012-178638

(51) Int. Cl.
| | |
|---|---|
| *H04N 9/80* | (2006.01) |
| *G11B 27/00* | (2006.01) |
| *G11B 27/28* | (2006.01) |
| *G11B 27/34* | (2006.01) |

(52) U.S. Cl.
CPC .............. *G11B 27/005* (2013.01); *G11B 27/28* (2013.01); *G11B 27/34* (2013.01)

(58) Field of Classification Search
CPC .................................................. G06F 19/321
USPC ........................................................ 386/343
See application file for complete search history.

(56) References Cited

U.S. PATENT DOCUMENTS

| | | | |
|---|---|---|---|
| 6,535,232 B1 | 3/2003 | Tsuda et al. ................... | 715/849 |
| 7,603,682 B1 * | 10/2009 | Akiyama et al. ................... | 725/9 |

FOREIGN PATENT DOCUMENTS

| | | |
|---|---|---|
| JP | H11-265461 | 9/1999 |
| JP | 2001-128098 | 5/2001 |
| JP | 2007-252763 | 10/2007 |
| JP | 2012016488 A * | 1/2012 |

OTHER PUBLICATIONS

H. Masaki, "Diagnostic Process in Chest CT", RT No. 38, *Eisai, Medical Tribune*, pp. 126-138 (Nov. 2011), with machine translation.
PS 3.3-2001 Digital Imaging and Communications in Medicine (DICOM) Part 3 Information Object Definitions (2001)(author not known).

* cited by examiner

*Primary Examiner* — Hung Dang
*Assistant Examiner* — Girumsew Wendmagegn
(74) *Attorney, Agent, or Firm* — Fitzpatrick, Cella, Harper & Scinto

(57) ABSTRACT

Disclosed is a display control apparatus for performing display control in order to display an image on a display apparatus; the display control apparatus comprising an input unit configured to input image group data composed of a plurality of images to be sequentially played; an acquiring unit configured to acquire information of a display size of a specific object included in each of the images; and a deciding unit configured to decide a play speed at which the plurality of images are sequentially played one by one in accordance with the display size of the specific object included in each of the images.

21 Claims, 36 Drawing Sheets

| IMAGE ID | TYPE OF LESION | POSITION COORDINATE OF LESION | SIZE OF LESION |
|---|---|---|---|
| 1 | ABSENT | (0,0) | 0pixel |
| 8 | CALCIFICATION | (200,30) | 15pixel |
| 14 | CALCIFICATION | (230,30) | 30pixel |
| 21 | CALCIFICATION | (230,30) | 40pixel |
| 28 | CALCIFICATION | (230,30) | 32pixel |
| 34 | CALCIFICATION | (230,30) | 10pixel |
| 40 | ABSENT | (0,0) | 0pixel |
| m | ABSENT | (0,0) | 0pixel |

| SETTING INFORMATION CONCERNING PAGING IMAGE READING | PRESET VALUE |
|---|---|
| DISPLAY MAGNIFICATION OF IMAGE | DotByDot |
| PLAY SPEED OF IMAGE | AUTOMATIC |
| RESOLUTION OF DISPLAY UNIT | 1920 × 1080 |
| PIXEL PITCH OF DISPLAY UNIT | 0.25mm/pixel |

*Fig.6*

| PRESENCE OR ABSENCE OF LESION | DISPLAY SIZE H OF LESION | IMAGE PLAY SPEED |
|---|---|---|
| LESION IS ABSENT | H = 0mm | 10fps |
| LESION IS PRESENT | 0mm < H < 3mm | 1fps |
| LESION IS PRESENT | 3mm ≦ H < 5mm | 2fps |
| LESION IS PRESENT | 5mm ≦ H < 7mm | 4fps |
| LESION IS PRESENT | 7mm ≦ H | 8fps |

*Fig.7*

| PRESENCE OR ABSENCE OF LESION | DISPLAY SIZE H OF LESION | IMAGE PLAY SPEED |
|---|---|---|
| LESION IS ABSENT | H = 0mm | USER SET VALUE |
| LESION IS PRESENT | 0mm < H < 3mm | USER SET VALUE * 1/10 |
| LESION IS PRESENT | 3mm ≦ H < 5mm | USER SET VALUE * 2/10 |
| LESION IS PRESENT | 5mm ≦ H < 7mm | USER SET VALUE * 4/10 |
| LESION IS PRESENT | 7mm ≦ H | USER SET VALUE * 8/10 |

*Fig.11*

| PRESENCE OR ABSENCE OF LESION | DISPLAY SIZE H OF LESION | IMAGE PLAY SPEED |
|---|---|---|
| LESION IS ABSENT | H = 0mm | 10fps |
| LESION IS PRESENT (CALCIFICATION) | 0mm < H < 3mm | 2fps |
| | 3mm ≦ H < 5mm | 4fps |
| | 5mm ≦ H < 7mm | 8fps |
| | 7mm ≦ H | 10fps |
| LESION IS PRESENT (FROSTED GLASS-LIKE SITUATION) | 0mm < H < 3mm | 1fps |
| | 3mm ≦ H < 5mm | 2fps |
| | 5mm ≦ H < 7mm | 4fps |
| | 7mm ≦ H | 8fps |

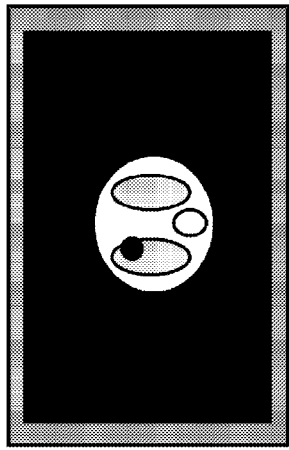
Fig.16A
RESOLUTION: 1280 × 1024
PIXEL PITCH: 0.3mm/dot
SIZE OF LESION: 5.4mm
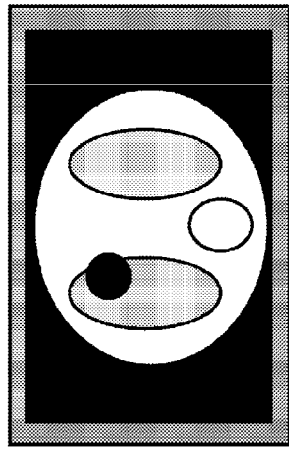
Fig.16C
RESOLUTION: 1280 × 1024
PIXEL PITCH: 0.15mm/dot
SIZE OF LESION: 2.7mm
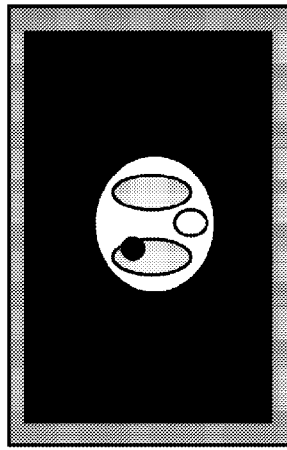
Fig.16B
RESOLUTION: 2560 × 2048
PIXEL PITCH: 0.15mm/dot
SIZE OF LESION: 2.7mm
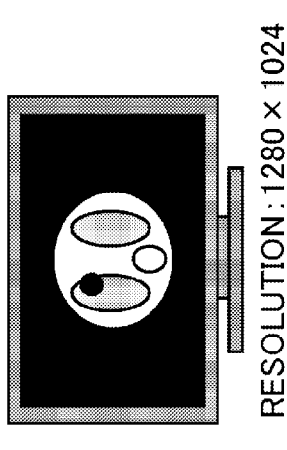
Fig.16D
RESOLUTION: 2560 × 2048
PIXEL PITCH: 0.15mm/dot
SIZE OF LESION: 2.7mm
Fig.16E
×1 MAGNIFICATION ON DISPLAY
RESOLUTION OF IMAGE: 512 × 512pixel
SIZE OF LESION: 18pixel

| CT (HU) VALUE | |
|---|---|
| 4000 | METAL |
| 2000 | TEETH AND TUSKS |
| 1000 | BONE |
| 100 | |
| 80 | TUMOR |
| 60 | |
| 40 | SOFT TISSUE |
| 20 | CYST |
| 0 | WATER |
| −10 | |
| −100 | ADIPOSE TISSUE |
| −1000 | AIR |

*Fig.19*

| IMAGE ID | TYPE OF LESION | POSITION COORDINATE OF LESION | SIZE OF LESION VERTICAL * LATERAL (pixel) |
|---|---|---|---|
| 1 | ABSENT | (0,0) | 0*0 |
| 8 | CALCIFICATION | (200,30) | 5*5 |
| 9 | CALCIFICATION | (230,30) | 10*10 |
| 10 | CALCIFICATION | (230,30) | 15*15 |
| 11 | CALCIFICATION | (230,30) | 8*8 |
| 12 | ABSENT | (0,0) | 0*0 |
| 18 | CALCIFICATION | (100,200) | 20*20 |
| 19 | ABSENT | (0,0) | 0*0 |
| 25 | CALCIFICATION | (200,400) | 10*10 |
| 25 | CALCIFICATION | (300,30) | 10*5 |
| M | ABSENT | (0,0) | 0*0 |

| SIZE H OF ENTIRE LESION | TOTAL NUMBER OF DISPLAY SECOND(S) |
|---|---|
| $0mm^2 = H$ | 1 SECOND |
| $0mm^2 < H < 9mm^2$ | 8 SECONDS |
| $9mm^2 \leq H < 25mm^2$ | 6 SECONDS |
| $25mm^2 \leq H < 49mm^2$ | 4 SECONDS |
| $49mm^2 \leq H$ | 2 SECONDS |

*Fig.23*

| LESION START IMAGE ID | NUMBER OF SEQUENTIAL IMAGES N | ENTIRE LESION SIZE H (mm$^2$) |
|---|---|---|
| 1 | 7 | 0 |
| 8 | 4 | 25.875 |
| 12 | 6 | 0 |
| 18 | 1 | 25 |
| ... | ... | ... |

*Fig.25*

| IMAGE ID | IMAGE PLAY SPEED (fps) |
|---|---|
| 1 | 7 |
| 2 | 7 |
| 3 | 7 |
| 4 | 7 |
| 5 | 7 |
| 6 | 7 |
| 7 | 7 |
| 8 | 1 |
| 9 | 1 |
| 10 | 1 |
| 11 | 1 |
| 12 | 6 |
| ⋮ | ⋮ |
| 18 | 0.25 |
| ⋮ | ⋮ |
| M | ... |

*Fig.27*

| PRESENCE OR ABSENCE OF LESION | ENTIRE LESION SIZE H | NUMBER OF TOTAL DISPLAY SECOND(S) |
|---|---|---|
| LESION IS ABSENT | 0mm² = H | 1 SECOND |
| LESION IS PRESENT (CALCIFICATION) | 0mm² < H < 9mm² | 8 SECONDS |
| | 9mm² ≦ H < 25mm² | 6 SECONDS |
| | 25mm² ≦ H < 49mm² | 4 SECONDS |
| | 49mm² ≦ H | 2 SECONDS |
| LESION IS PRESENT (FROSTED GLASS-LIKE SITUATION) | 0mm² < H < 9mm² | 10 SECONDS |
| | 9mm² ≦ H < 25mm² | 8 SECONDS |
| | 25mm² ≦ H < 49mm² | 6 SECONDS |
| | 49mm² ≦ H | 2 SECONDS |

| LESION START IMAGE ID | NUMBER OF SEQUENTIAL IMAGES N | MAXIMUM LESION IMAGE ID L | ENTIRE LESION SIZE H (mm$^2$) |
|---|---|---|---|
| 1 | 7 | 1 | 0 |
| 8 | 4 | 10 | 25.875 |
| 12 | 6 | 12 | 0 |
| 18 | 1 | 18 | 25 |
| ⋮ | ⋮ | ⋮ | ⋮ |
| ... | ... | ... | ... |

*Fig.33*

| IMAGE ID | IMAGE PLAY SPEED (fps) |
|---|---|
| 1 | 7 |
| 2 | 7 |
| 3 | 7 |
| 4 | 7 |
| 5 | 7 |
| 6 | 7 |
| 7 | 7 |
| 8 | 1.5 |
| 9 | 1.5 |
| 10 | 0.5 |
| 11 | 1.5 |
| 12 | 6 |
| ⋮ | ⋮ |
| 18 | 0.25 |
| ⋮ | ⋮ |
| M | ... |

*Fig.35*

DISPLAY CONTROL APPARATUS, DISPLAY APPARATUS, AND METHOD FOR CONTROLLING THE SAME

BACKGROUND OF THE INVENTION

1. Field of the Invention

The present invention relates to a display control apparatus, a display apparatus, and a method for controlling the same.

2. Description of the Related Art

In recent years, the monitor diagnosis, in which a medical viewer is used, is in the mainstream in the image reading (interpretation) site in accordance with the digitization of the medical image. Further, it is necessary that the image reading should be performed for a large number of images in order to perform the diagnosis depending on the modality (for example, CT (computerized tomography), MRI (magnetic resonance imaging)), wherein the time, which is required for the image reading, is prolonged as well. Therefore, it is necessary to provide such an image reading method that the image reading can be performed efficiently in the site in which the image reading is required to be performed for a large number of cases (medical cases) within a limited time.

One of the image reading methods is the paging image reading in which the image reading is performed while displaying images of a tomographic image group generated by the modality one by one at a constant speed on a monitor. The paging image reading makes it possible to quickly perform the image reading for a large number of images. Therefore, the paging image reading is the effective means to specify an image in which a lesion candidate exists, from a large number of images ("Radiological Technologist/Radiological Technology No. 38", planned and issued by Eisai Co., Ltd., edited by Medical Tribune, November 2007 (p. 126-p. 138: Diagnostic Process in Chest CT, written by Masaki HARA)).

As for the setting of the image play speed during the paging image reading, a medical doctor (physician or image reading doctor), who performs the image reading, previously performs the input from the screen of a viewer to carry out the setting, on condition that his/her image reading ability is taken into consideration.

A technique is known to carry out the paging image reading as described above more efficiently. That is, a technique is disclosed, in which the image reading time for the entire tomographic image group is shortened by quickening or advancing the image play speed for portions in which any lesion candidate is not present (Japanese Patent Application Laid-open No. 2007-252763).

Further, a technique is disclosed, in which the image play speed is changed for an interval that is marking-designated by an image reading doctor, irrelevant to the presence or absence of any lesion candidate (Japanese Patent Application Laid-open No. 2001-128098).

SUMMARY OF THE INVENTION

As the modality acquires the high performance, it is possible to photograph and diagnose the region (part) at fine intervals (for example, 500 μm). Such a case is increased that one lesion is photographed or picked up sequentially in a plurality of images.

As described in "Radiological Technologist/Radiological Technology No. 38" described above, the oversight ratio of lesion, which occurs during the paging image reading, is affected by the display size of the lesion and the number of image(s) in which the lesion is photographed. Specifically, the oversight ratio of lesion is more increased as the display size of the lesion is smaller. Further, the oversight ratio of lesion is more increased for the lesion which is consecutively photographed in a smaller number of image or images.

The performance of the monitor for displaying the medical image (resolution (number of pixels) and pixel pitch) is variously changed depending on the image reading site. For example, two monitors, which are shown in FIGS. 20A and 20B, have the same screen size as that of a monitor shown in FIG. 20C, but they have different resolutions. Therefore, the pixel pitch differs therebetween. For this reason, the pitch per one pixel is small in the monitor shown in FIG. 20A as compared with FIG. 20B, and hence the monitor shown in FIG. 20A can display pixels of the number which is four times that of the monitor shown in FIG. 20B. On the contrary, when an image of the same number of pixels is displayed, the display size for FIG. 20A is ¼ of that for FIG. 20B. Also in the case of monitors in which the screen size differs therebetween but the resolution is identical with each other, the display size differs as well because the pixel pitch differs therebetween.

Therefore, even when an identical image (lesion) is displayed, the display size of the displayed lesion consequently differs on account of the difference in the performance of the monitor on which the image is displayed. Further, in the case of monitors in which the screen size differs therebetween but the resolution is identical with each other, the display size of the displayed lesion consequently differs as well because the pixel pitch differs therebetween.

In "Radiological Technologist/Radiological Technology No. 38" described above, it is possible to change the image play speed depending on the presence or absence of the lesion. However, the image play speed, which is brought about for the image having the lesion existing therein, is a constant speed irrelevant to the size or dimension of the lesion. Therefore, the image reading can be performed in a short period of time when the image play speed is fast. However, when the displayed lesion is small, then the time to observe the contents (details) of the image is insufficient, and there is such a possibility that the lesion may be overlooked. On the contrary, when the image play speed is slow, the oversight ratio can be reduced or lessened. However, in this case, when the lesion has such a size that the lesion can be found with ease, it is also necessary to wait until the next image is displayed even after the lesion is found, wherein it is feared that the image reading efficiency may be lowered.

The situation, in which one lesion is photographed in a single image, is compared as follows with the situation in which one lesion is photographed consecutively in a plurality of images. That is, the period of time, in which one lesion is displayed entirely (hereinafter referred to as "total display time of the entire lesion"), is more prolonged for the lesion which is photographed consecutively in a plurality of images. In other words, the total display time of the entire lesion is consequently proportional to the number of image(s) in which the lesion is photographed. Therefore, when a large lesion, which can be found with ease, is consecutively photographed in a plurality of images, then the total display time is prolonged as well, and it is feared that the image reading efficiency may be lowered. On the contrary, when a small lesion, which can be hardly found, is photographed in only a single image, then the total display time is short, the image reading time is insufficient, and it is feared that the lesion may be overlooked.

On the other hand, in PS3.3-2001 Translation, Digital image and communication in medical treatment (DICOM), Volume 3: Information object definition, Published by National Electrical Manufacturers Association, the total display time of the lesion can be adjusted by designating an interval and changing the image play speed for the designated interval. However, it is difficult to perform the setting upon the seeing for the first time (first sight). In other words, it is difficult upon the seeing for the first time to judge the extent of the existence of the lesion in any image in a tomographic image group and judge in what number of images the lesion is consecutively photographed. Further, if it is intended to finely set the image play speed, the time and labor are required.

In view of the above, the present invention relates to a display apparatus for assisting the operation to find a specific object included in an image or images by consecutively observing a plurality of image groups, wherein such a technique is provided that both of the shortening of the time required to find the specific object and the reduction of the possibility to overlook the specific object are realized.

A first aspect of the present invention resides in a display control apparatus for performing display control in order to display an image on a display apparatus, the display control apparatus comprising:

an input unit configured to input image group data composed of a plurality of images to be sequentially played;

an acquiring unit configured to acquire information of a display size of a specific object included in each of the images; and a deciding unit configured to decide a play speed at which the plurality of images are sequentially played one by one in accordance with the display size of the specific object included in each of the images.

A second aspect of the present invention resides in a control method for controlling a display apparatus for performing display control in order to display an image on the display apparatus, the control method comprising:

inputting image group data composed of a plurality of images to be sequentially played;

acquiring information of a display size of a specific object included in each of the images; and deciding a play speed at which the plurality of images are sequentially played one by one in accordance with the display size of the specific object included in each of the images.

A third aspect of the present invention resides in a display control apparatus for performing display control in order to display an image on a display apparatus, the display control apparatus comprising:

an input unit configured to input image group data composed of a plurality of images to be sequentially played;

an acquiring unit configured to acquire information of a display size of a specific object included in each of the images; and a deciding unit configured to decide a play speed at which the images, in which the specific object is included, are sequentially played one by one in accordance with an entire size obtained by totalizing the display sizes of the specific object included in the respective images and a number of the images in which the specific object is included.

A fourth aspect of the present invention resides in a control method for controlling a display apparatus for performing display control in order to display an image on the display apparatus, the control method comprising:

inputting image group data composed of a plurality of images to be sequentially played;

acquiring information of a display size of a specific object included in each of the images; and deciding a play speed at which the images, in which the specific object is included, are sequentially displayed one by one in accordance with an entire size obtained by totalizing the display sizes of the specific object included in the respective images and a number of the images in which the specific object is included.

According to the present invention, in the display apparatus for assisting the operation to find a specific object included in an image or images by consecutively observing a plurality of image groups, it is possible to realize both of the shortening of the time required to find the specific object and the reduction of the possibility to overlook the specific object.

Further features of the present invention will become apparent from the following description of exemplary embodiments with reference to the attached drawings.

BRIEF DESCRIPTION OF THE DRAWINGS

FIG. 6 shows exemplary setting information concerning paging image reading according to the first and fourth embodiments.

FIG. 7 shows a first exemplary image play speed determining table according to the first embodiment.

FIG. 11 shows a second exemplary image play speed determining table according to the first embodiment.

FIG. 12 shows a third exemplary image play speed determining table according to the first embodiment.

FIGS. 16A to 16E show exemplary displays of tomographic image data in relation to each of monitors according to the second embodiment.

FIG. 19 shows a correlation between the CT value and the lesion according to the third embodiment.

FIG. 23 shows a first exemplary image play speed determining table according to the fourth embodiment.

FIG. 25 shows exemplary information outputted by the entire lesion size calculating unit according to the fourth embodiment.

FIG. 27 shows exemplary information outputted by the image play speed deciding unit according to the fourth embodiment.

FIG. 31 shows a second exemplary image play speed determining table according to the fourth embodiment.

FIG. 33 shows exemplary information outputted by the entire lesion size calculating unit according to the fifth embodiment.

FIG. 35 shows exemplary information outputted by the image play speed deciding unit according to the fifth embodiment.

DESCRIPTION OF THE EMBODIMENTS

First Embodiment

A first embodiment of the present invention will be explained below with reference to the drawings.

In the first embodiment, an explanation will be made about an exemplary case concerning a medical image display apparatus in which the presence or absence of the lesion and the size (dimension) thereof are extracted from accompanying information of tomographic image data, the display size of the lesion to be actually displayed on a monitor is calculated, and the image play speed is controlled. The term "user" refers to an image reading doctor for the medical image display apparatus unless otherwise specifically noted.

Figure 1:
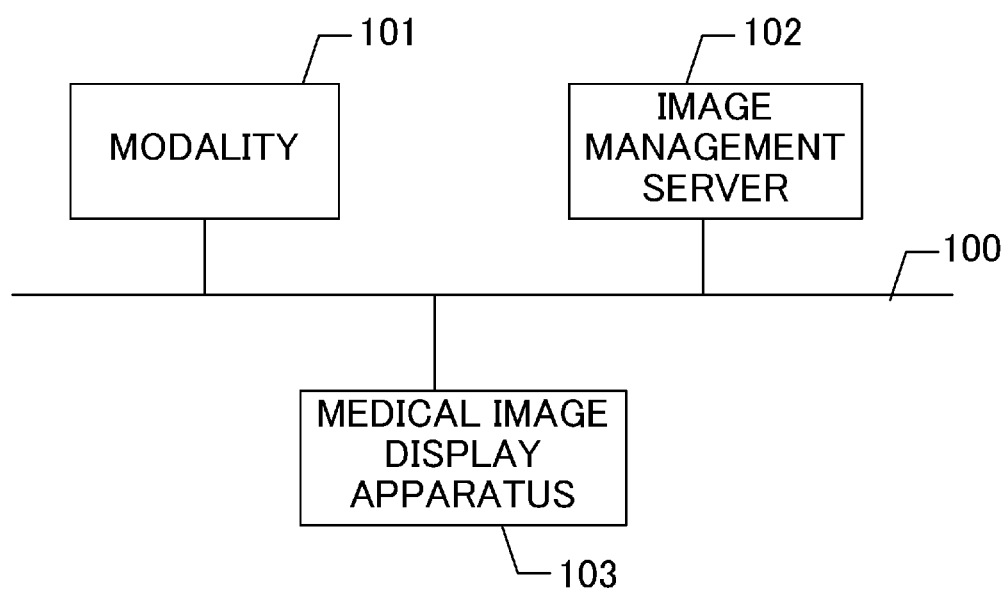
FIG. 1 schematically shows a medical image assistance system according to first and fourth embodiments.

FIG. 1 schematically shows a computer network system for transmitting the tomographic image data between the apparatuses in the first embodiment. As shown in FIG. 1, a modality 101, an image management server 102, and a medical image display apparatus 103 are connected to one another via in-hospital LAN (Local Area Network) 100. In this context, the modality 101 is the apparatus which photographs and generates the medical tomographic image, including, for example, X-ray CT, MRI, PET, and SPECT. The modality 101 acquires the tomographic image in which a specific object such as any lesion or the like existing at the inside of a test object is included (photographed or picked up). The image management server 102 is the apparatus which receives and stores the tomographic image generated by the modality 101 via the in-hospital LAN 100.

Figure 2:
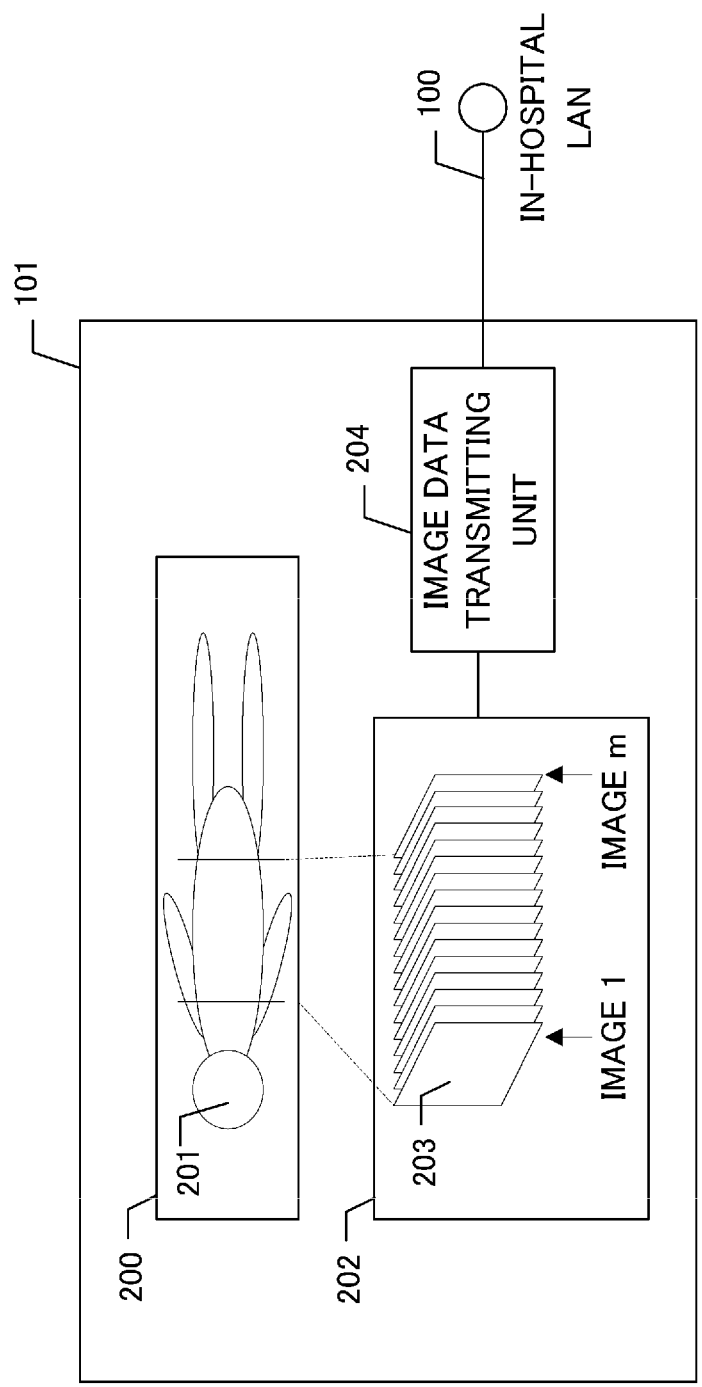
FIG. 2 shows a block diagram illustrating the construction of a modality according to the first and fourth embodiments.

FIG. 2 shows a block diagram illustrating the construction of the modality 101 according to the first embodiment. As shown in FIG. 2, the modality 101 is provided with a tomographic image pickup unit 200 for photographing the tomographic image of the test object 201, a tomographic image generating unit 202, and an image data transmitting unit 204, and the modality 101 is connected to the in-hospital LAN 100.

The modality 101 photographs or picks up the tomographic image of the test object 201 by means of the tomographic image pickup unit 200. The tomographic image generating unit 202 generates the tomographic image data 203 as the medical image group data based on the medical image format from the tomographic image photographed by the tomographic image pickup unit 200.

The image data transmitting unit 204 transmits the tomographic image data 203 generated by the tomographic image generating unit 202 to the image management server 102 via the in-hospital LAN 100 in accordance with a request of the operator of the modality 101. In another case, the image data transmitting unit 204 transmits the tomographic image data 203 to the medical image display apparatus 103 via the in-hospital LAN 100 in accordance with a request of the user.

Figure 3:
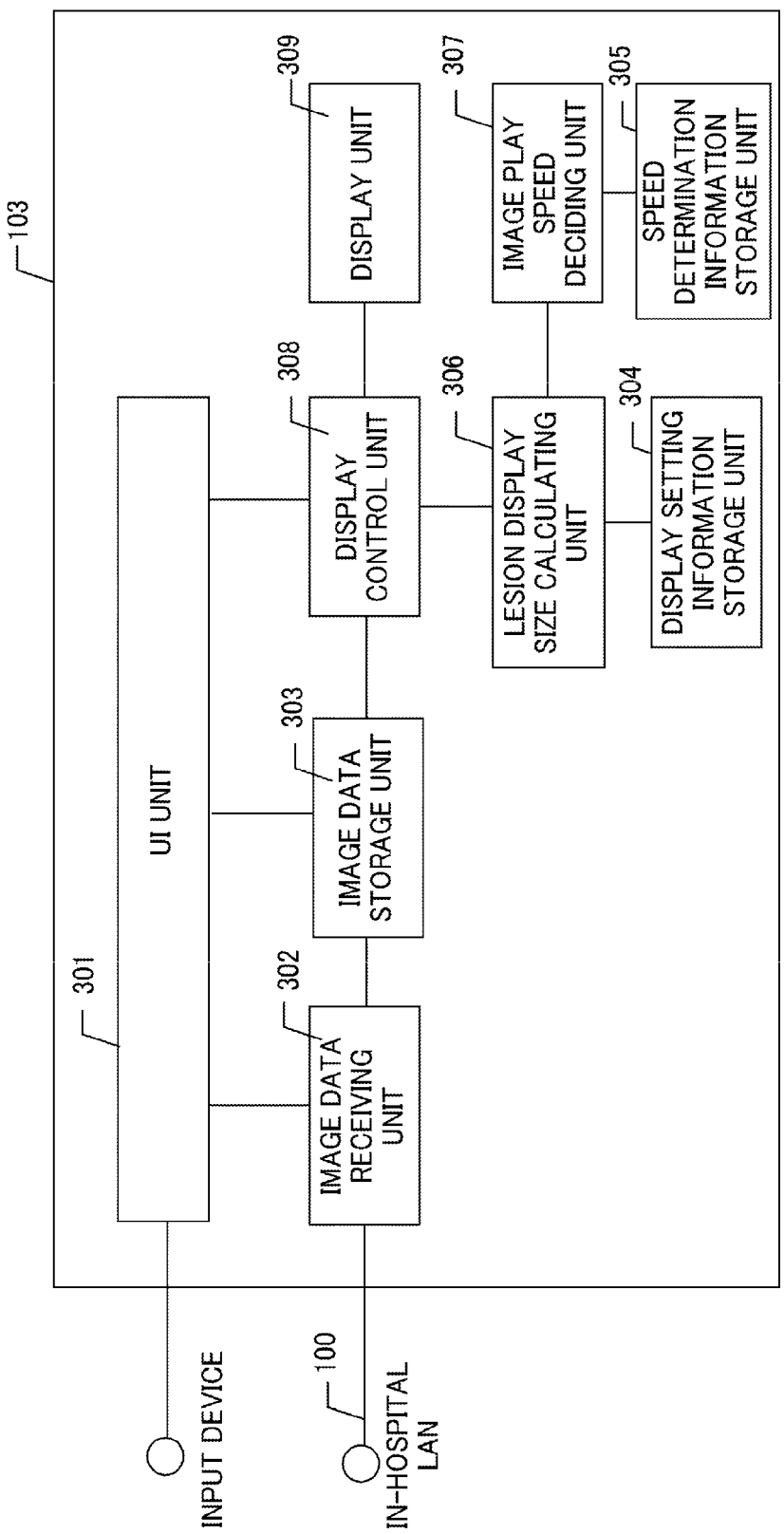
FIG. 3 shows a block diagram illustrating the construction of a medical image display apparatus according to the first embodiment.

FIG. 3 shows a block diagram illustrating the construction of the medical image display apparatus 103 according to the first embodiment. The medical image display apparatus 103 is provided with a UI unit 301, an image data receiving unit 302, an image data storage unit 303, a display setting information storage unit 304, a speed determination information storage unit 305, a lesion display size calculating unit 306, an image play speed deciding unit 307, a display control unit 308, and a display unit 309.

Figure 4A:
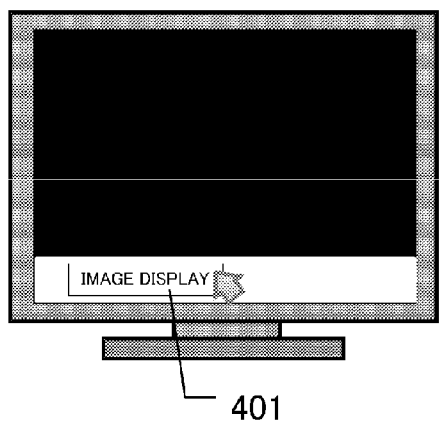
FIG. 4A and FIG. 4B show exemplary screens when a user operates according to the first and fourth embodiments.
Figure 4B:
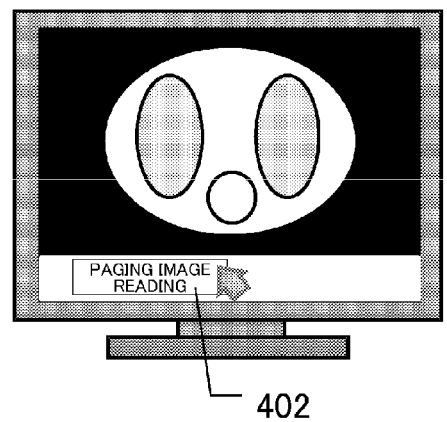

The UI unit 301 accepts the input operation from the user by the aid of an input device (for example, a mouse and/or a keyboard) connected to the medical image display apparatus 103. Further, the UI unit 301 informs the respective processing units of the input operation. For example, when an image display button 401 is depressed as shown in FIG. 4A, the UI unit 301 informs the image data receiving unit 302 of the acquisition of the image data as described later on. On the other hand, when a paging image reading button 402 is depressed as shown in FIG. 4B, the UI unit 301 informs the display control unit 308 of the start of the paging image reading as described later on. Further, the UI unit 301 performs the setting operation, for example, for the display magnification of the image (for example, Dot By Dot, ×2 magnification display, full screen display) as the setting during the paging image reading.

Figures 5A, 5B:
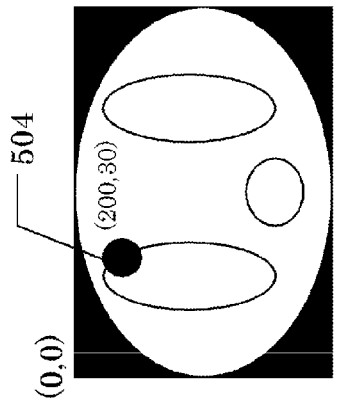
FIG. 5A shows exemplary image accompanying information according to the first embodiment.
FIG. 5B shows a lesion position.

The image data receiving unit 302 receives the tomographic image data 203 from the modality 101 or the image management server 102 via the in-hospital LAN 100, and the tomographic image data 203 is sent to the image data storage unit 303. The tomographic image data 203 to be received is accompanied by the information for which the modality 101 has previously analyzed the presence or absence of the lesion in the image and the size of the lesion when the modality 101 generates the tomographic image data 203. FIG. 5A shows exemplary image accompanying information. The lesion type information 501, the lesion position coordinate information 502, and the lesion size (dimension) information 503 in the image are described in the accompanying information. For example, as shown in FIG. 5B, the position (200, 30) of the lesion of Image ID 8 shown in FIG. 5A indicates the fact that the lesion exists at the position of 200 pixel in the right direction and 30 pixel in the downward direction by using the origin of the upper-left apex of the image.

The image data storage unit 303 stores the tomographic image data 203 accepted from the image data receiving unit 302. The medium for storage may be either a nonvolatile memory such as a hard disk or the like or a volatile memory such as RAM or the like.

The display setting information storage unit 304 retains the display magnification of the image, the resolution (number of pixels) of the display unit 309, and the pixel pitch information per one pixel as the setting information concerning the paging image reading as shown in FIG. 6. The medium for storage may be either a nonvolatile memory such as a hard disk or the like or a volatile memory such as RAM or the like.

The speed determination information storage unit 305 retains the information as shown in FIG. 7 as the information table for determining the image play speed (play speed) when a plurality of tomographic images are sequentially played one by one. The present invention is not limited to the sequential playing of the tomographic images. The present invention is also applicable to the sequential playing of general images, i.e., the playing of moving images (animation images). The medium for storage may be either a nonvolatile memory such as a hard disk or the like or a volatile memory such as RAM or the like. The determining table for the image play speed is prepared on the basis of the relationship between the display size of the lesion and the oversight ratio (see, for example, "Radiological Technologist/Radiological Technology No. 38" described above). An exemplary preparing method is as follows. At first, the image reading time, which is required in order that the oversight ratio of the lesion is not more than a certain value, is measured for an image as the image reading objective (reference image is available). Subsequently, the image reading time is subjected to the division from the display size of the lesion of the image to calculate the image reading area per unit time. The amount of movement of the line of sight of the user is limited per unit time. Therefore, the image reading area per unit time means the range in which the user can perform the image reading per unit time. Therefore, the image reading time, which corresponds to the display size of the lesion, can be calculated from the range in which the user can perform the image reading per unit time. The image reading time, which corresponds to the display size of the lesion, is the time in which one image is displayed, and thus the image play speed is decided.

The lesion display size calculating unit 306 judges whether or not the lesion is present in each of the tomographic image data from the accompanying information of the tomographic image data 203. If the lesion is present, the lesion display size calculating unit 306 calculates the display size of the lesion from the accompanying information of the tomographic image data 203 and the setting information (display magnification, pixel pitch per one pixel of the display unit 309) concerning the paging image reading stored in the display setting information storage unit 304. Further, the lesion display size calculating unit 306 informs the image play speed deciding unit 307 of the calculated display size of the lesion.

Details of the process of the lesion display size calculating unit 306 will be described later on.

The image play speed deciding unit 307 decides the image play speed during the paging image reading from the display size of the lesion calculated by the lesion display size calculating unit 306 and the determining table for the image play speed previously stored in the speed determination information storage unit 305, and the image play speed deciding unit 307 informs the display control unit 308 of the image play speed.

Details of the process of the image play speed deciding unit 307 will be described later on.

The display control unit 308 acquires the tomographic image data 203 stored in the image data storage unit 303, and the tomographic image data 203 is outputted to the display unit 309. During the paging image reading, the tomographic image data displayed on the display unit 309 is successively switched in accordance with the image play speed decided by the image play speed deciding unit 307.

Details of the process of the display control unit 308 will be described later on.

The display unit 309 actually displays the tomographic image data 203 outputted from the display control unit 308.

(Explanation of Process Flow of Lesion Display Size Calculating Unit 306)

Figure 8:
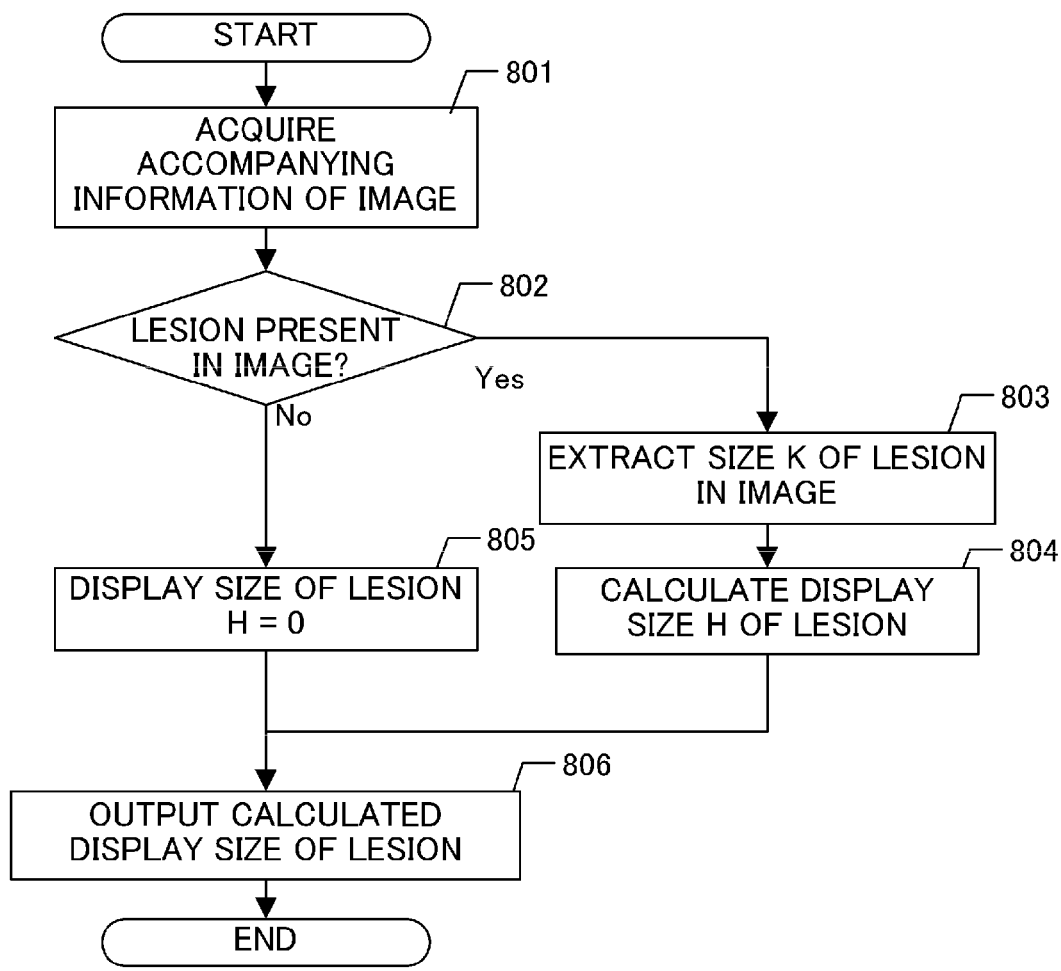
FIG. 8 shows an operation flow of a lesion display size calculating unit according to the first embodiment.

FIG. 8 shows a process flow of the lesion display size calculating unit 306.

In Step S801, the lesion display size calculating unit 306 acquires the lesion type information 501 of the accompanying information in order to judge whether or not any lesion is present in the tomographic image data which is being displayed.

In Step S802, if the acquired lesion type information 501 is any one other than "absent" (for example, calcification or the like), then the lesion display size calculating unit 306 judges that the lesion is present, and the process proceeds to Step S803. If the lesion type information 501 is "absent", then the lesion display size calculating unit 306 judges that the lesion is absent, and the process proceeds to Step S805.

In Step S803, the lesion display size calculating unit 306 acquires the lesion size information 503 included in the accompanying information, and the value is retained for the size K of the lesion.

$$K(\text{pixel}) = \text{lesion size information } 503$$

In Step S804, the lesion display size calculating unit 306 acquires the display magnification of the image and the pixel pitch of the display unit 309 from the setting information concerning the paging image reading retained in the display setting information storage unit 304 in order to calculate the display size of the lesion to be actually displayed on the monitor. The lesion display size calculating unit 306 calculates the lesion display size H (mm) in accordance with the following expression.

$$H(\text{mm}) = K(\text{pixel}) \times \text{display magnification of image} \times \text{pixel pitch}(\text{mm/pixel})$$

In Step S805, the lesion display size calculating unit 306 substitutes 0 for the display size H (mm) of the lesion.

In Step S806, the lesion display size calculating unit 306 outputs, to the image play speed deciding unit 307, the display size H (mm) of the lesion calculated in S804 or S805 described above, and the process is completed.

If a plurality of lesions are present in an identical image, the lesion display size calculating unit 306 substitutes the display size of the lesion having the smallest display size for the display size H (mm) on the basis of the lesion size information 503 of the image accompanying information.

(Explanation of Process Flow of Image Play Speed Deciding Unit 307)

Figure 9:
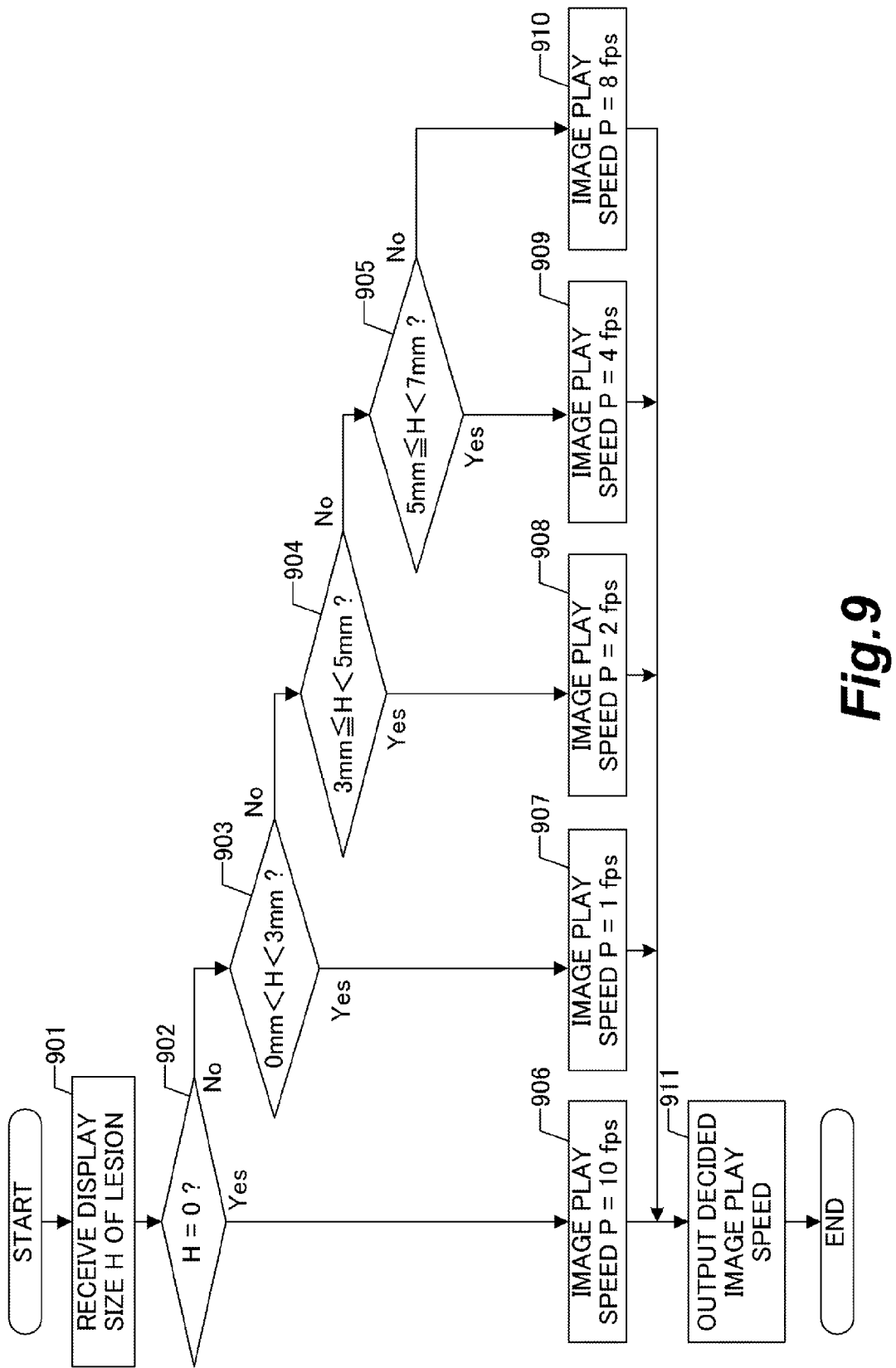
FIG. 9 shows an operation flow of an image play speed deciding unit according to the first embodiment.

FIG. 9 shows an operation flow of the image play speed deciding unit 307.

In Step S901, the image play speed deciding unit 307 receives the display size H (mm) of the lesion calculated by the lesion display size calculating unit 306, and the process proceeds to Step S902.

In Step S902, if the display size H (mm) of the lesion is 0, the image play speed deciding unit 307 proceeds to Step S906. The image play speed is decided from the image play speed determining table (FIG. 7) retained in the speed determination information storage unit 305, and the decided image play speed is substituted for the image play speed P. In the first embodiment of the present invention, the image play speed deciding unit 307 substitutes 10 (fps) for the image play speed P. If the display size H (mm) of the lesion has any value other than 0, the image play speed deciding unit 307 proceeds to Step S903.

In Step S903, if the display size H (mm) of the lesion fulfills 0<H<3 mm, the image play speed deciding unit 307 proceeds to Step S907. The image play speed is decided from the image play speed determining table (FIG. 7) retained in the speed determination information storage unit 305, and the decided image play speed is substituted for the image play speed P. In the first embodiment of the present invention, the image play speed deciding unit 307 substitutes 1 (fps) for the image play speed P. If the display size H (mm) of the lesion has any value other than those which fulfill 0<H<3 mm, the image play speed deciding unit 307 proceeds to Step S904.

In Step S904, if the display size H (mm) of the lesion fulfills 3≤H<5 mm, the image play speed deciding unit 307 proceeds to Step S908. The image play speed is decided from the image play speed determining table (FIG. 7) retained in the speed determination information storage unit 305, and the decided image play speed is substituted for the image play speed P. In the first embodiment of the present invention, the image play speed deciding unit 307 substitutes 2 (fps) for the image play speed P. If the display size H (mm) of the lesion has any value other than those which fulfill 3≤H<5 mm, the image play speed deciding unit 307 proceeds to Step S905.

In Step S905, if the display size H (mm) of the lesion fulfills 5≤H<7 mm, the image play speed deciding unit 307 proceeds to Step S909. The image play speed is decided from the image play speed determining table (FIG. 7) retained in the speed determination information storage unit 305, and the decided image play speed is substituted for the image play speed P. In the first embodiment of the present invention, the image play speed deciding unit 307 substitutes 4 (fps) for the image play speed P. If the display size H (mm) of the lesion has any value other than those which fulfill 5≤H<7 mm, the image play speed deciding unit 307 proceeds to Step S910. The image play speed is decided from the image play speed determining table (FIG. 7) retained in the speed determination information storage unit 305, and the decided image play speed is substituted for the image play speed P.

In Step S911, the image play speed deciding unit 307 outputs the decided image play speed P (fps) to the display control unit 308, and the process is completed.

(Explanation of Process Flow of Display Control Unit 308)

Figure 10:
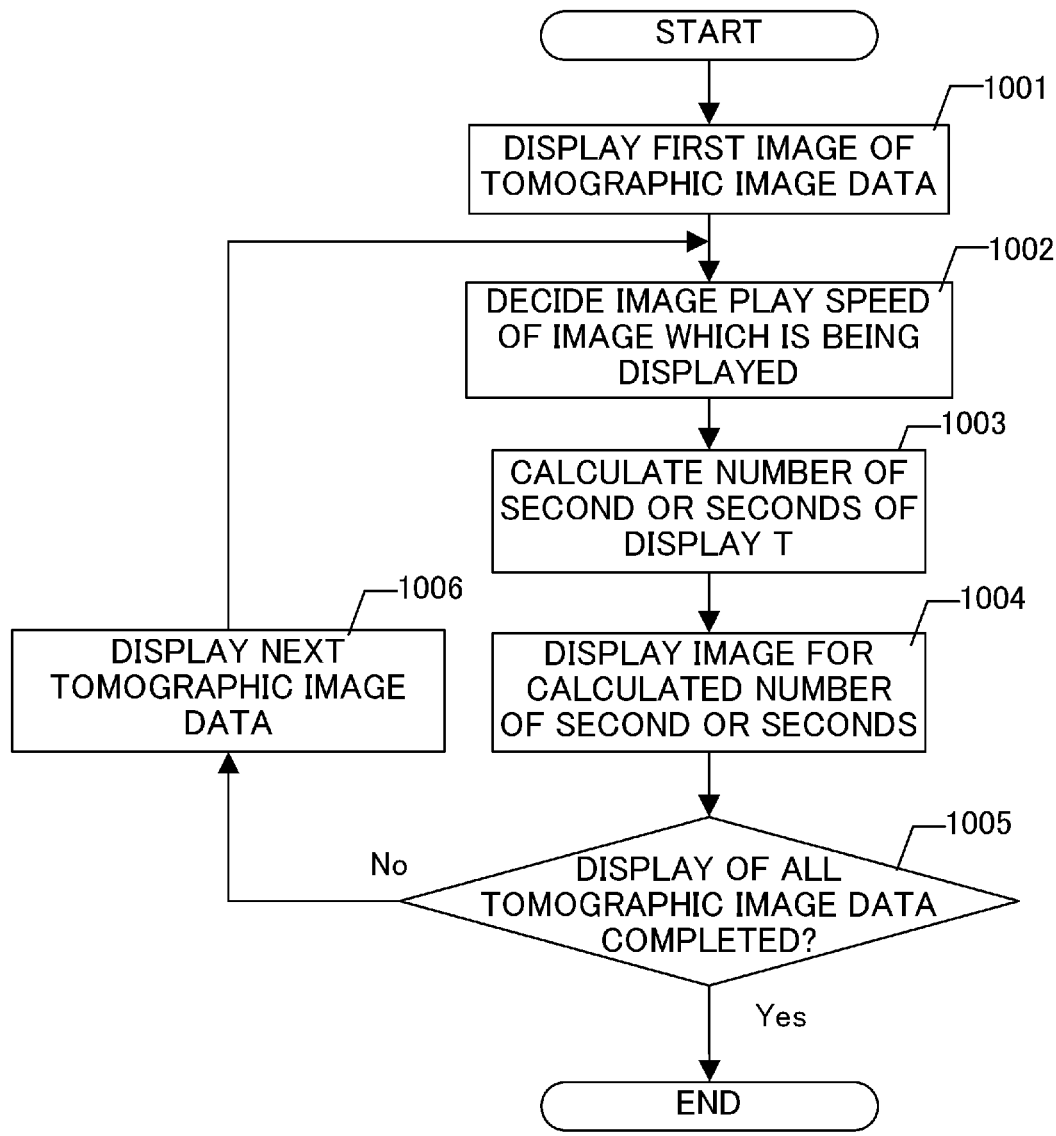
FIG. 10 shows an operation flow of a display control unit according to the first embodiment.

FIG. 10 shows a process flow of the display control unit 308.

In Step S1001, the display control unit 308 acquires all of m images of the tomographic image data from the image data storage unit 303 upon the start of the paging image reading. One image disposed at the head is outputted to the display unit 309, and the image is displayed.

In Step S1002, the display control unit 308 informs the lesion display size calculating unit 306 of the image which is being displayed, in order to decide the image play speed of the displayed tomographic image data. The display control unit 308 receives the image play speed P decided by the image play speed deciding unit 307.

In Step S1003, the display control unit 308 calculates the display time T of the tomographic image data which is being displayed, in accordance with the following expression from the image play speed P decided in S1002.

Display time $T(s)$ per one image = $1/P$(fps)

For example, according to the determining table for the image play speed shown in FIG. 5A, the image play speed P, which is provided if the lesion is absent, is 10 fps, and the display time is 0.1 second. If the image play speed P is 2 fps, the display time is 0.5 second.

In Step S1004, the display control unit 308 sequentially displays the tomographic image data which is being displayed, for the display time calculated in S1003. After that, the process proceeds to Step S1005.

In Step S1005, the display control unit 308 judges whether or not all of the m images of the tomographic image data have been displayed. If all of the images are not displayed, the process proceeds to Step S1006. If all of the images of the tomographic image data are displayed, the display control unit 308 completes the paging image reading.

In Step S1006, the display control unit 308 outputs the next tomographic image data to the display unit 309 so that the next tomographic image data is displayed. The processes, which range from S1002 to S1005, are repeated again.

Figure 13:
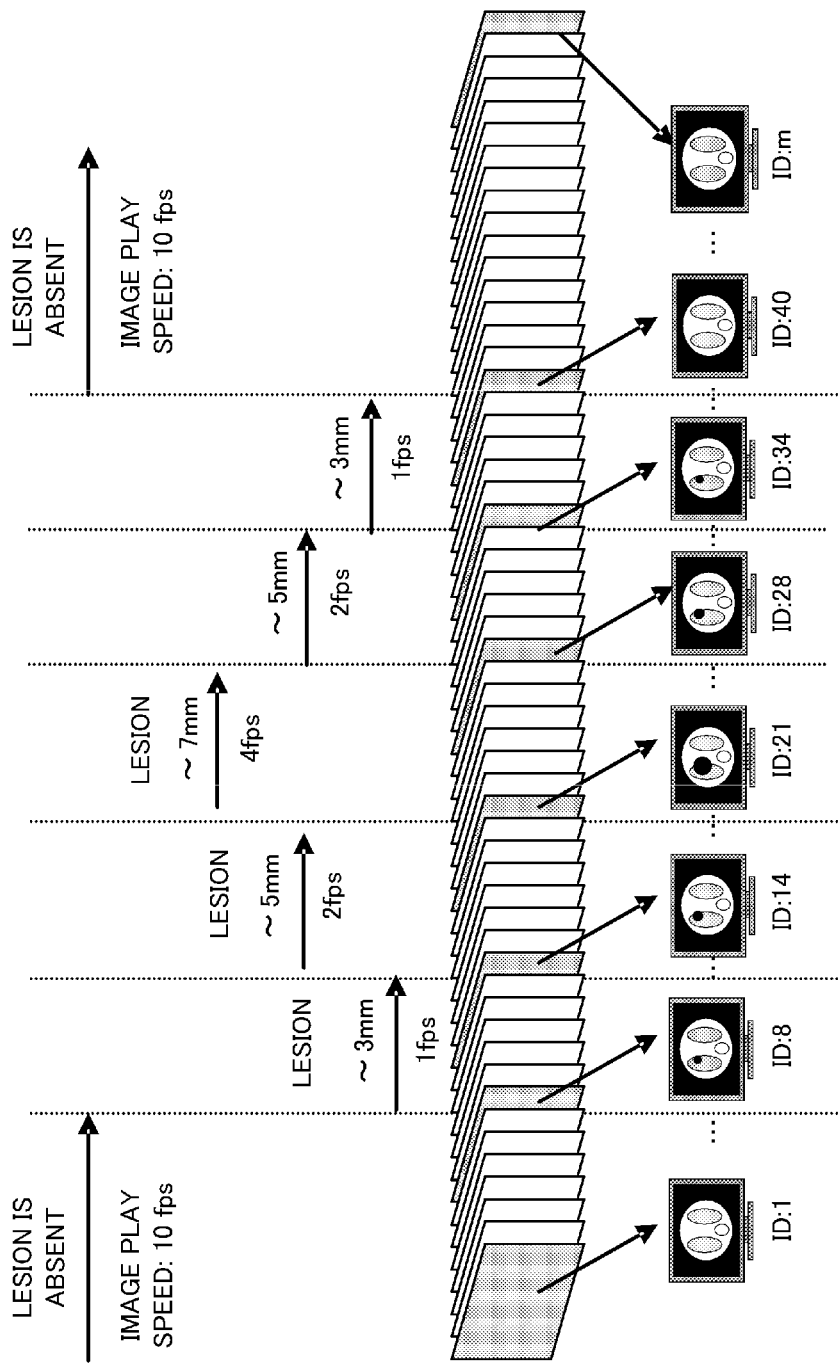
FIG. 13 shows exemplary image play speeds during the paging image reading according to the first embodiment.

FIG. 13 shows exemplary transition or change of the image play speed provided when the tomographic image data 203 is subjected to the paging image reading according to the first embodiment of the present invention. In other words, at the stage at which the lesion begins to appear in the tomographic image and the display size is small during the paging image reading, the image play speed is retarded (slowed down) so that the oversight ratio is reduced or lessened. As the display size of the lesion is gradually increased, the image play speed is quickened (advanced) so that the image reading time is shortened.

As described above, according to the present invention, the image play speed in the paging image reading is changed to the adequate speed in accordance with the display size of the lesion. Therefore, it is possible to reduce the oversight ratio of the lesion, and it is possible to suppress any unnecessary prolongation of the time required to perform the image reading.

The first embodiment of the present invention is illustrative of the exemplary case in which the accompanying information of the image is analyzed and the image play speed is decided every time when one image of the tomographic image data is displayed. However, it is also allowable to adopt the following procedure. That is, the image accompanying information of all of the tomographic image data is previously analyzed before the paging image reading, and the display time is calculated for all of the tomographic image data. After that, the display is started.

The first embodiment of the present invention is illustrative of the exemplary case in which the image play speed is the predetermined speed depending on the display size of the lesion. However, as shown in FIG. 11, it is also appropriate that the user can set the image play speed. In this case, as shown in FIG. 11, the following procedure is also appropriate. That is, the user sets the image play speed which serves as the reference, and thus the image play speed is automatically calculated for each of the display sizes of the lesion. As shown in FIG. 11, the image play speed is calculated so that the play speed is the fastest for the tomographic image in which the lesion is absent, while the image play speed is made faster as the display size is more increased for the tomographic image in which the lesion is present. This procedure is based on the fact that the probability of oversight tends to be low for the image having the large display size even when the image play speed is fast. The relationship between the image play speed and the oversight ratio depends on the experience and the ability of the user who performs the image reading. When the user can set the image play speed as shown in FIG. 11, the image play speed can be changed thereby in accordance with the display size of the lesion while taking the image reading ability of the user into consideration. Therefore, the convenience is further improved. Even in the case of such a situation, it is also appropriate that the image play speed, which can be set by the user, is restricted so that the oversight ratio of the lesion is less than a certain value.

The first embodiment of the present invention is illustrative of the exemplary case in which the correlation of the image play speed, which is provided in accordance with the display size, does not depend on the type of the lesion. However, as shown in FIG. 12, it is also appropriate that the correlation is allowed to differ in accordance with the type of the lesion.

Accordingly, even when the display size of the lesion is identical, the image play speed can be changed in accordance with the type of the lesion. It is possible to further improve the image reading efficiency of the user.

In the first embodiment of the present invention, the image data storage unit 303, the display setting information storage unit 304, and the speed determination information storage unit 305 have been explained in the divided or separated manner. However, it is also appropriate to adopt the construction in which the information to be stored in these units is stored in an identical storage unit.

The first embodiment of the present invention is illustrative of the exemplary case in which the tomographic image data is subjected to the paging image reading. However, the present invention is also applicable to any paging image reading of images of the simple X-ray or the like, other than the tomographic image data.

Second Embodiment

In a second embodiment of the present invention, an explanation will be made about a case in which a medical image display apparatus and a display monitor are separated from each other. Any detailed explanation will be omitted for those which are the same as those explained in the first embodiment. An explanation will be principally made about the difference from the first embodiment.

Figure 14:
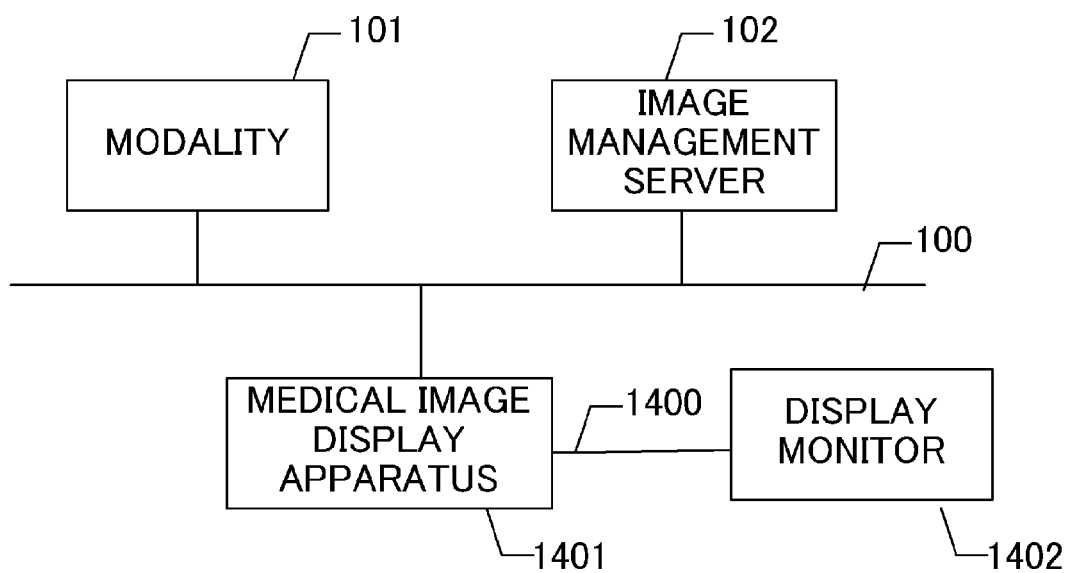
FIG. 14 schematically shows a medical image assistance system according to a second embodiment.

FIG. 14 schematically shows a mode in which a medical image display apparatus 1401 according to the second embodiment is connected to a display monitor 1402 via a data transmission line 1400. In this arrangement, the data transmission line 1400 utilizes a system which is capable of transmitting/receiving the video signal and the monitor information. The data transmission line 1400 may be based on either a wired system or a wireless system. The wired system includes, for example, DVI (Display Visual Interface), HDMI (High-Definition Multimedia Interface), and Display Port. The wireless system includes, for example, Wireless HD and WHDI (Wireless Home Digital Interface).

Figure 15:
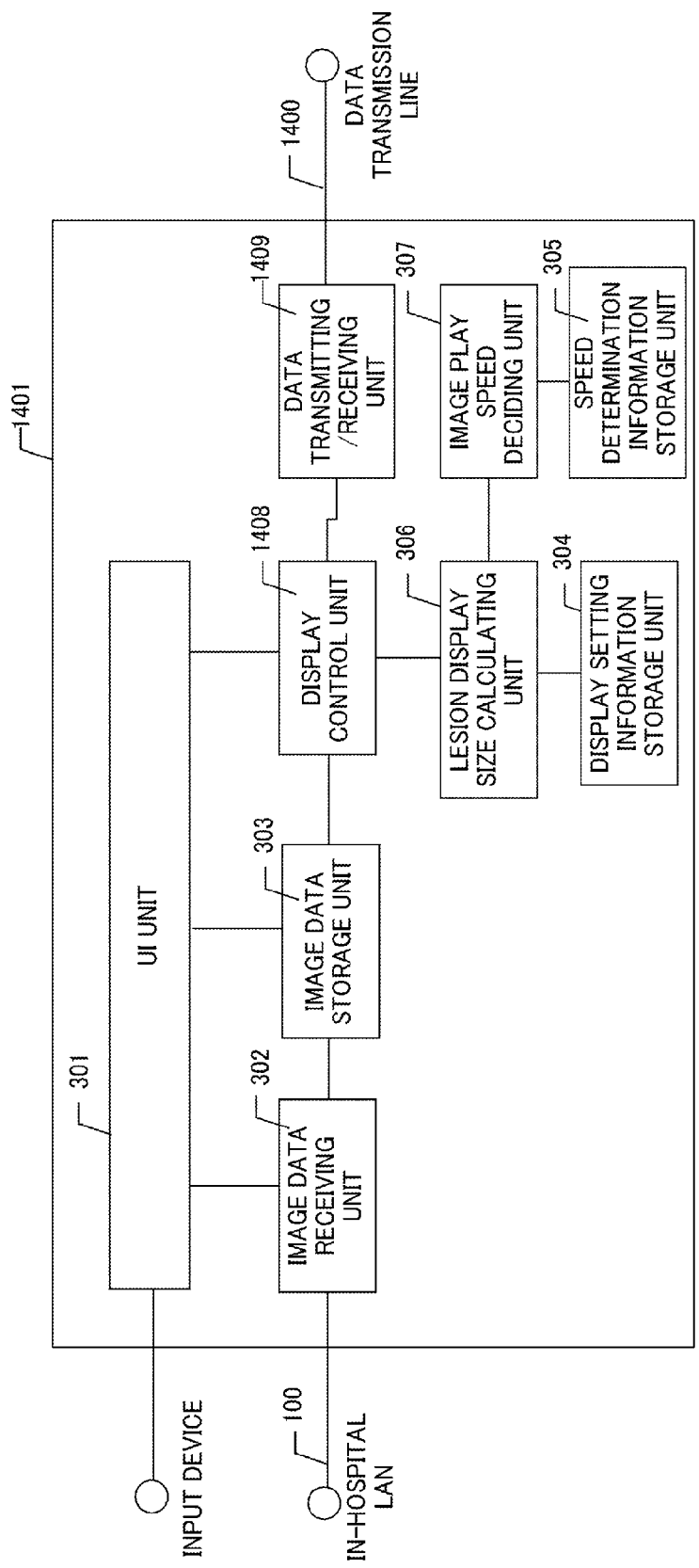
FIG. 15 shows a block diagram illustrating the construction of a medical image display apparatus according to the second embodiment.

FIG. 15 shows a block diagram illustrating the construction of the medical image display apparatus 1401 according to the second embodiment. The difference from the first embodiment resides in that a data transmitting/receiving unit 1409 is added, the process of a display control unit 1408 differs, and the display unit 309 is absent.

The data transmitting/receiving unit 1409 transmits the tomographic image data 203 to be displayed to the display monitor 1402 via the data transmission line 1400 in accordance with the request of the display control unit 1408. Further, the data transmitting/receiving unit 1409 acquires the monitor information from the display monitor 1402 via the data transmission line 1400. In this arrangement, the monitor information is the data in which the specification of the monitor such as EDID (Extended display identification data) or the like is described in numerical values.

The display control unit 1408 analyzes the monitor information acquired from the display monitor 1402 by the data transmitting/receiving unit 1409. The information about the resolution (number of pixels) and the pixel pitch of the display monitor 1402 is extracted, and the information is stored as the setting information concerning the paging image reading in the display setting information storage unit 304. The numerical value data, which relates to the vertical and lateral (horizontal) pixel pitches of the screen, can be acquired from First Detailed Timing Description of EDID. Further, the resolution can be calculated in accordance with the following expression on the basis of the numerical value data concerning the actual size values of the vertical and lateral (horizontal) lengths of the screen of Basic Display Parameters of EDID.

Resolution=actual size value/pixel pitch

When the tomographic image data 203 stored in the image data storage unit 303 is displayed, the display control unit 1408 informs the data transmitting/receiving unit 1409 that the tomographic image data 203 is displayed.

As for the operation flow, the lesion display size calculating unit 306 calculates the display size of the lesion for each of the tomographic images from the setting information concerning the paging image reading stored in the display setting information storage unit 304 in the same manner as in the first embodiment. The image play speed deciding unit 307 decides the image play speed depending on the display size of the lesion in accordance with the determining table for the display size of the lesion and the image play speed stored in the speed determination information storage unit 305.

FIGS. 16A to 16E show exemplary displays of the tomographic image data in relation to each of display monitors to be connected to the medical image display apparatus 1401. According to the second embodiment of the present invention, as shown in FIGS. 16A and 16B, when the monitors, in which the pixel pitch differs even if the screen size of the monitor is identical, are connected, the display size of the lesion displayed on the display monitor differs. Therefore, in this case, the display is performed for the paging image reading at different image play speeds. On the other hand, as shown in FIGS. 16C and 16D, when the pixel pitch is identical even if the size of the display monitor differs, the display size of the lesion is identical. Therefore, in this case, the display is performed for the paging image reading at an identical image play speed.

As described above, the monitor information of the connected monitor is acquired from EDID via the data transmission line 1400, and thus the display size of the lesion corresponding to the connected monitor can be calculated. Accordingly, the control can be performed to provide the image play speed at which the oversight ratio can be reduced and any unnecessary prolongation of the time required for the paging image reading can be suppressed.

Third Embodiment

In a third embodiment of the present invention, the information about the presence or absence and the size (dimension) of the lesion of each of the tomographic images is extracted by analyzing the tomographic image data 203 without extracting the information from the image accompanying information as performed in the first embodiment. An explanation will be made about an exemplary case in which the display size of the lesion to be actually displayed on the monitor is calculated on the basis thereof and the image play speed is controlled.

At first, an explanation will be made about the generation and the transmission of the medical tomographic image data by using the block diagrams shown in FIGS. 1 and 2. In the third embodiment of the present invention, the modality 101 is X-ray CT.

Figure 17:
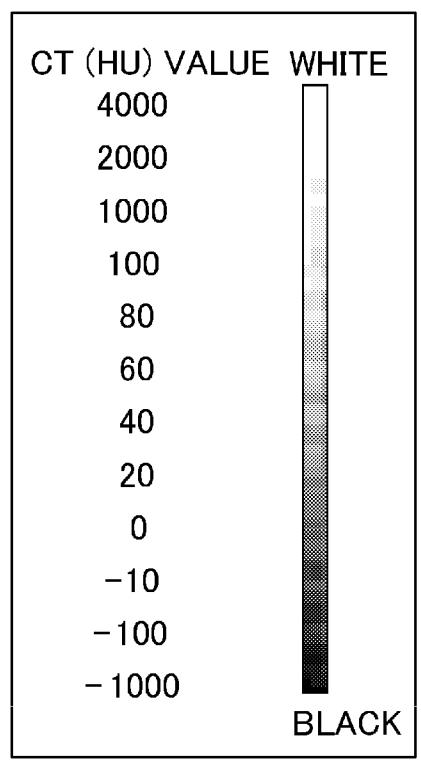
FIG. 17 shows a correlation between the CT value and the gray scale according to a third embodiment.

The modality 101 radiates the X-ray onto a test object 201 in the X-ray CT image pickup unit 200 to acquire the absorption value of the X-ray, i.e., the CT value (HU). The X-ray CT image generating unit 202 converts the CT value (HU) picked up by the X-ray CT image pickup unit 200 into the gray scale to provide the CT image. FIG. 17 shows an example of the conversion of the CT value (HU) (characteristic value) into the gray scale (pixel value of the tomographic image). Further, the X-ray CT image generating unit 202 generates the data based on the medical image format from the CT image. An explanation will be made in further detail later on about exemplary data based on the medical image format.

The image data transmitting unit 204 transmits the X-ray CT image data generated by the X-ray CT image generating unit 202 via the in-hospital LAN 100 and stores the data in the image management server 102 in accordance with a request of the operator of the modality 101. In another case, the image data transmitting unit 204 transmits the X-ray CT image data to the medical image display apparatus 103 via the in-hospital LAN 100 in accordance with a request of the user.

An explanation will now be made about exemplary data based on the medical image format in the third embodiment of the present invention.

Figure 18:
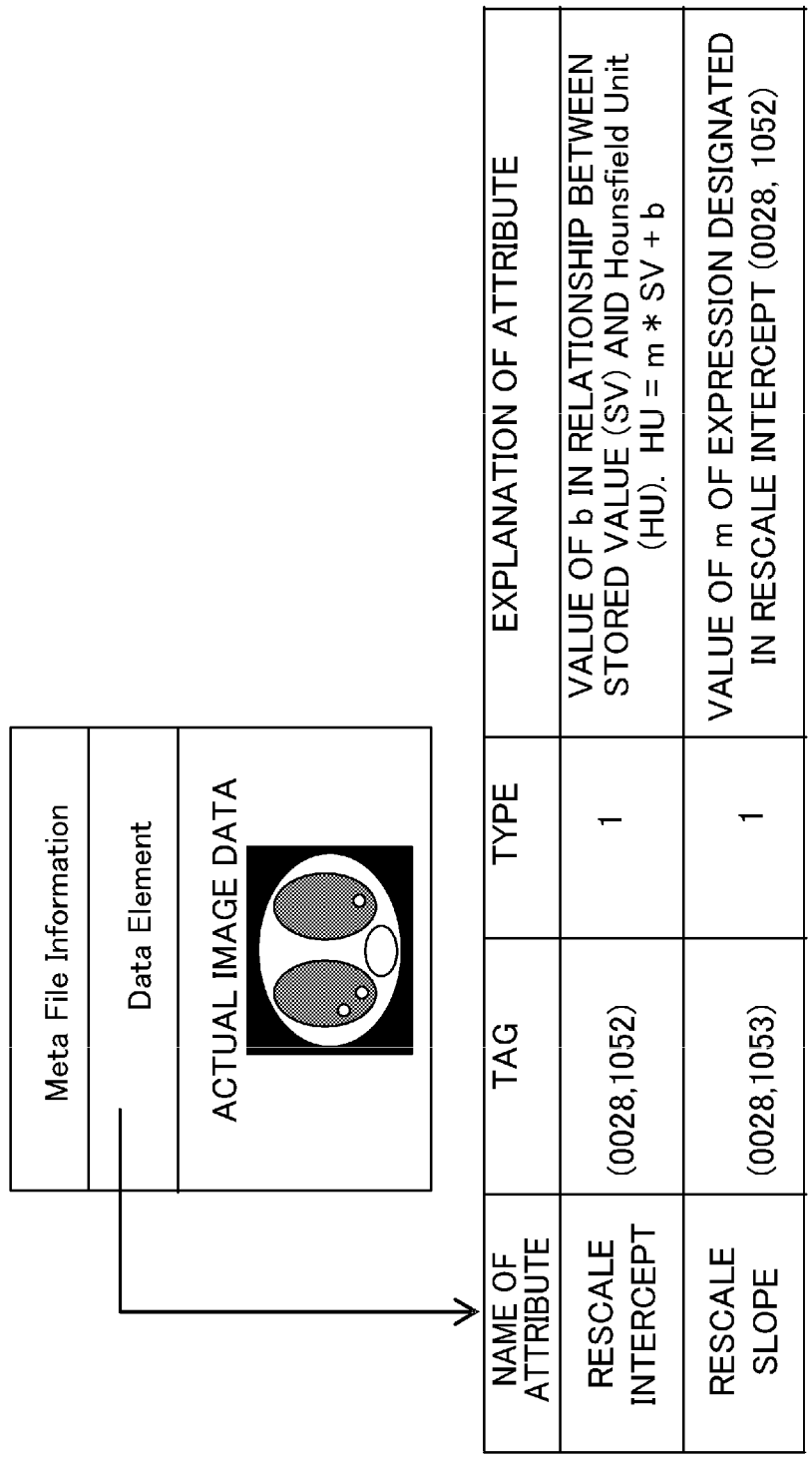
FIG. 18 shows the construction of image data based on the DICOM standard according to the third embodiment.
Figure 20:
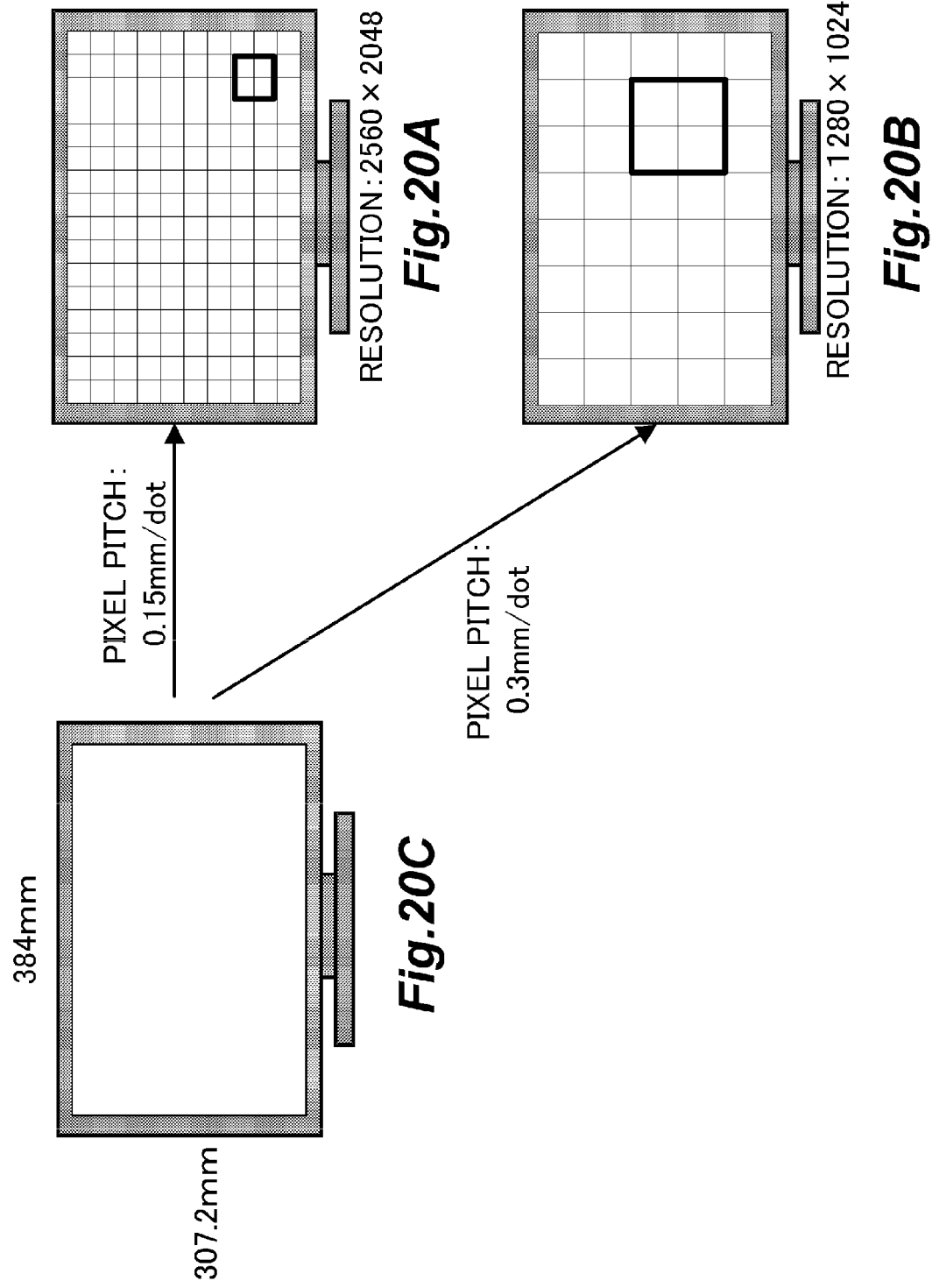
FIGS. 20A and 20C illustrate monitors.

FIG. 18 shows the data construction provided when the DICOM (Digital Imaging and Communication in Medicine) standard is applied as the medical image format. The data is constructed by Meta File Information including the information generally concerning the data file, Data Element including the information concerning the patient and the information concerning the image data, and the actual image data.

In the case of the DICOM data specification, it is possible to store the converted information of the CT value (HU) and the pixel data. The data conversion can be performed in accordance with the calculation expression HU=m*SV+b by using the information of the rescale intercept b and the rescale slope m included in Data Element shown in FIG. 18. In this context, SV indicates each pixel data, and HU means the CT value (HU) (see "Digital image and communication in medical treatment (DICOM), Volume 3" described above).

Next, an explanation will be made about the operation of the medical image display apparatus 103 by using the block diagram shown in FIG. 3.

The lesion display size calculating unit 306 calculates the CT value corresponding to each of the pixels of the tomographic image data 203 from the information stored in the DICOM data explained above to extract the pixels in which the CT value is within a certain range. For example, the lesion display size calculating unit 306 extracts the pixels in which the CT value falls under a predetermined range (for example, 60 to 80 (HU)) from a relationship between the CT value and the lesion shown in FIG. 19. If the pixels, in which the CT value falls under 60 to 80 (HU), are present, then the lesion display size calculating unit 306 performs the image analysis to judge by what pixels the concerning pixels continue, and the size (number of pixels) of the lesion (tumor) is analyzed.

The lesion display size calculating unit 306 calculates the display size of the lesion from the analyzed size of the lesion and the setting information concerning the paging image reading stored in the display setting information storage unit 304.

The presence or absence and the size (dimension) of the lesion are calculated from the CT value of each of the pixels of the tomographic image data. Accordingly, even when any analysis result such as those of CAD or the like is not appended as the accompanying information to the tomographic image data, then it is possible to calculate the display size of the lesion, and it is possible to control the image play speed so that the image play speed is the speed corresponding to the lesion size.

Fourth Embodiment

A fourth embodiment of the present invention will be explained below with reference to the drawings.

In the fourth embodiment, an explanation will be made about an exemplary case concerning a medical image display apparatus in which the size (dimension) of the entire lesion photographed or picked up over a plurality of images is calculated on the basis of the accompanying information of the tomographic image data, and the image play speed is controlled in accordance with the calculated size of the entire lesion and the number of image(s) in which the lesion is photographed. The term "user" refers to the image reading doctor for the medical image display apparatus unless otherwise specifically noted.

FIG. 1 schematically shows a computer network system for transmitting the tomographic image data between the apparatuses in the fourth embodiment. As shown in FIG. 1, a modality 101, an image management server 102, and a medical image display apparatus 103 are connected to one another via in-hospital LAN (Local Area Network) 100. In this context, the modality 101 is the apparatus which photographs and generates the medical tomographic image, including, for example, X-ray CT, MRI, PET, and SPECT. The modality 101 acquires the tomographic image in which an object such as any lesion or the like existing at the inside of a test object is photographed or picked up. The image management server 102 is the apparatus which receives and stores the tomographic image generated by the modality 101 via the in-hospital LAN 100.

FIG. 2 shows a block diagram illustrating the construction of the modality 101 according to the fourth embodiment. As shown in FIG. 2, the modality 101 is provided with a tomographic image pickup unit 200 for photographing the tomographic image of the test object 201, a tomographic image generating unit 202, and an image data transmitting unit 204, and the modality 101 is connected to the in-hospital LAN 100.

The modality 101 photographs or picks up the tomographic image of the test object 201 by means of the tomographic image pickup unit 200. The tomographic image generating unit 202 generates the tomographic image data 203 as the medical image group data based on the medical image format from the tomographic image photographed by the tomographic image pickup unit 200.

The image data transmitting unit 204 transmits the tomographic image data 203 generated by the tomographic image generating unit 202 to the image management server 102 via the in-hospital LAN 100 in accordance with a request of the operator of the modality 101. In another case, the image data transmitting unit 204 transmits the tomographic image data 203 to the medical image display apparatus 103 via the in-hospital LAN 100 in accordance with a request of the user.

Figure 21:
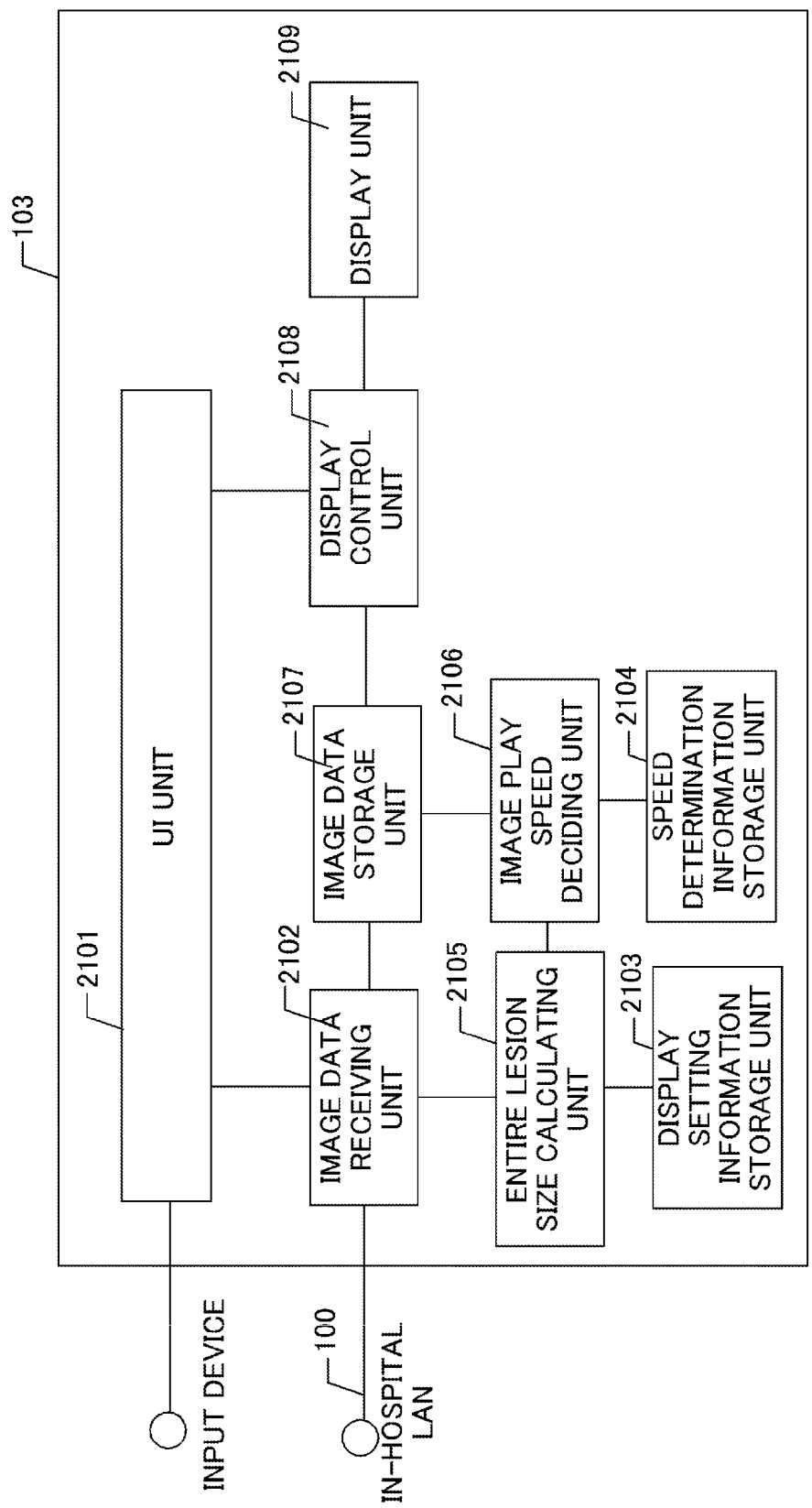
FIG. 21 shows a block diagram illustrating the construction of a medical image display apparatus according to the fourth embodiment.

FIG. 21 shows a block diagram illustrating the construction of the medical image display apparatus 103 according to the fourth embodiment. The medical image display apparatus 103 is provided with a UI unit 2101, an image data receiving unit 2102, a display setting information storage unit 2103, a speed determination information storage unit 2104, an entire lesion size calculating unit 2105, an image play speed deciding unit 2106, an image data storage unit 2107, a display control unit 2108, and a display unit 2109.

The UI unit 2101 accepts the input operation from the user by the aid of an input device (for example, a mouse and/or a keyboard) connected to the medical image display apparatus 103. Further, the UI unit 2101 informs the respective processing units of the input operation. For example, when an image display button 401 is depressed as shown in FIG. 4A, the UI unit 2101 informs the image data receiving unit 2102 of the acquisition of the image data as described later on. On the other hand, when a paging image reading button 402 is depressed as shown in FIG. 4B, the UI unit 2101 informs the display control unit 2108 of the start of the paging image reading as described later on. Further, the UI unit 2101 performs the setting operation, for example, for the display magnification of the image (for example, ×1 magnification display, ×2 magnification display, full screen display) as the setting during the paging image reading.

Figures 22A, 22B:
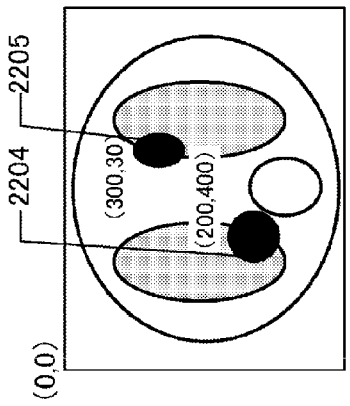
FIG. 22A shows exemplary image accompanying information according to the fourth embodiment.
FIG. 22B shows a relationship between the accompanying information and the lesion in the image.

The image data receiving unit 2102 receives the tomographic image data 203 from the modality 101 or the image management server 102 via the in-hospital LAN 100, and the tomographic image data 203 is sent to the entire lesion size calculating unit 2105 as described later on. The tomographic image data 203 to be received is accompanied by the information for which the modality 101 has previously analyzed the presence or absence of the lesion in the image and the size of the lesion when the modality 101 generates the tomographic image data 203. FIG. 22A shows exemplary image accompanying information. The lesion type information 2201, the lesion position coordinate information 2202, and the lesion size (dimension) information 2203 in the image are described in the accompanying information. If a plurality of lesions are present in an image, a number of pieces of the accompanying information corresponding to the number of lesions also exist. One piece of the accompanying information necessarily exists for an image in which no lesion is present. FIG. 22B shows the relationship between the accompanying information and the lesion in the image. When the accompanying information of Image ID 25 is used as an example, a lesion 2204 having a size of 10 pixel×10 pixel exists at the position of 200 pixel in the right direction and 400 pixel in the downward direction by using the origin of the upper-left apex of the image. Further, it is indicated that a lesion 2205 having a size of 10 pixel×5 pixel exists at the position of 300 pixel in the right direction and 30 pixel in the downward direction.

The image data storage unit 2107 stores the tomographic image data 203 accepted from the image data receiving unit 2102. The medium for storage may be either a nonvolatile memory such as a hard disk or the like or a volatile memory such as RAM or the like.

The display setting information storage unit 2103 retains the display magnification of the image, the resolution (number of pixels) of the display unit 2109, and the pixel pitch information per one pixel as the setting information concerning the paging image reading as shown in FIG. 6. The medium for storage may be either a nonvolatile memory such as a hard disk or the like or a volatile memory such as RAM or the like.

The speed determination information storage unit 2104 retains the information as shown in FIG. 23 as the information table for determining the image play speed (frame rate) when a plurality of tomographic images are sequentially displayed one by one. The image play speed determining table resides in the information of the predetermined correlation between the size of the entire lesion and the total number of display second(s) as the display period of the lesion. The medium for storage may be either a nonvolatile memory such as a hard disk or the like or a volatile memory such as RAM or the like. The determining table for the image play speed is prepared on the basis of the relationship between the display size of the lesion and the oversight ratio (see, for example, "Radiological Technologist/Radiological Technology No. 38" described above). An exemplary preparing method is as follows. At first, the image reading time, which is required in order that the oversight ratio of the lesion is not more than a certain value, is measured for an image as the image reading objective (reference image is available). Subsequently, the image reading time is subjected to the division from the display size of the lesion of the image to calculate the image reading area per unit time. The amount of movement of the line of sight of the user is limited per unit time. Therefore, the image reading area per unit time means the range in which the user can perform the image reading per unit time. Therefore, the image reading time, which corresponds to the display size of the lesion, can be calculated from the range in which the user can perform the image reading per unit time. The image reading time, which corresponds to the display size of the lesion, is the time in which one image is displayed, and thus the image play speed is decided.

The entire lesion size calculating unit 2105 calculates the size on the display of the lesion in each of the tomographic images from the accompanying information of each of the tomographic image data 203 and the setting information concerning the paging image reading stored in the display setting information storage unit 2103. The setting information concerning the paging image reading includes the display magnification and the pixel pitch per one pixel of the display unit 2109. The number of images in which an identical lesion is consecutively photographed or picked up is judged on the basis of the accompanying information of each of the tomographic image data 203 to calculate the size on the display of the entire lesion. The size on the display of the entire lesion is the entire size obtained by totalizing the display sizes of the concerning lesion in relation to all of the tomographic images in which the certain lesion is photographed or picked up. The image play speed deciding unit 2106 is informed of the calculated size on the display of the entire lesion and the number of images in which the lesion is consecutively photographed.

Details of the process of the entire lesion size calculating unit 2105 will be described later on. In the following description, the description, which is described as the size (dimension) of the lesion or the size (dimension) of the entire lesion, indicates the size (dimension) on the display.

The image play speed deciding unit 2106 decides the image play speed during the paging image reading from the size of the entire lesion calculated by the entire lesion size calculating unit 2105, the number of image(s) in which the lesion is photographed, and the determining table for the image play speed previously stored in the speed determination information storage unit 2104.

Details of the process of the image play speed deciding unit 2106 will be described later on.

The display control unit 2108 acquires the tomographic image data 203 stored in the image data storage unit 2107, and the tomographic image data 203 is outputted to the display unit 2109. During the paging image reading, the tomographic image data displayed on the display unit 2109 is successively switched in accordance with the image play speed decided by the image play speed deciding unit 2106.

Details of the process of the display control unit 2108 will be described later on.

The display unit 2109 actually displays the tomographic image data 203 outputted from the display control unit 2108.

(Explanation of Process Flow of Entire Lesion Size Calculating Unit 2105)

Figure 24:
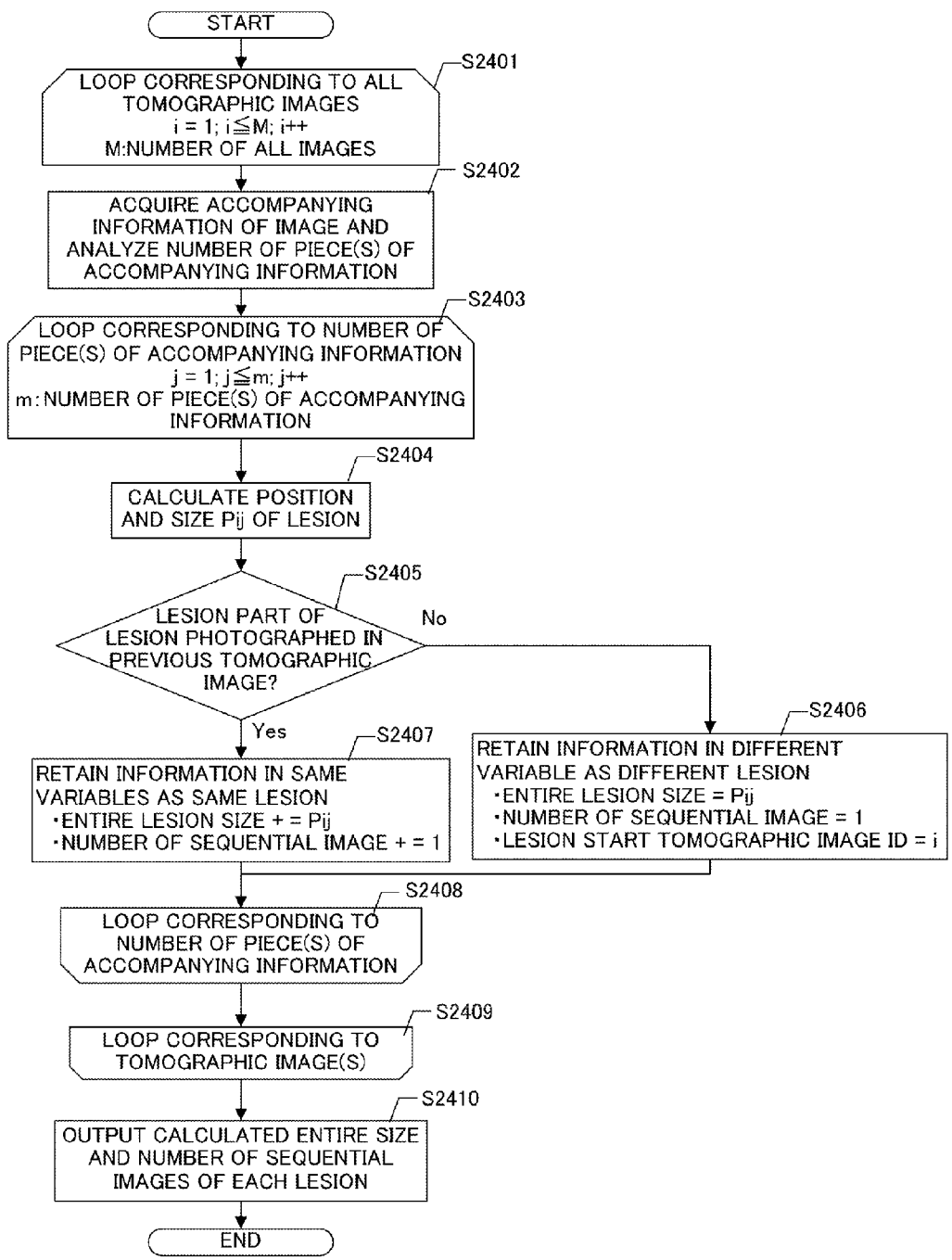
FIG. 24 shows an operation flow of an entire lesion size calculating unit according to the fourth embodiment.

FIG. 24 shows a process flow of the entire lesion size calculating unit 2105.

In Step S2401, the entire lesion size calculating unit 2105 repeatedly performs the processes ranging from Step S2402 to Step S2409 described later on a number of times corresponding to the number of image(s) of the tomographic image data 203 received from the image data receiving unit 2102. In the fourth embodiment of the present invention, the number of all of the tomographic images is M as shown in FIG. 22A (M is an integer of not less than 1). Therefore, the entire lesion size calculating unit 2105 repeats the processes M times.

In Step S2402, the entire lesion size calculating unit 2105 acquires the accompanying information for the tomographic image of Image ID=i (i=1 to M) of the tomographic image data 203. The entire lesion size calculating unit 2105 analyzes the number of pieces of the accompanying information, and the process proceeds to Step S2403. In the exemplary case shown in FIG. 22A, the number of piece of the accompanying information of the tomographic image of Image ID 18 is 1, and the number of pieces of the accompanying information of the tomographic image of Image ID 25 is 2.

In Step S2403, the entire lesion size calculating unit 2105 repeatedly performs the processes ranging from Step S2404 to Step S2408 described later on a number of times corresponding to the number of piece(s) of the accompanying information included in the image data (designated as m, m is an integer of not less than 1) analyzed in S2402 described above.

In Step S2404, the entire lesion size calculating unit 2105 calculates the size Pij in which the lesion is displayed on the display unit 2109, in relation to the lesion j existing in the tomographic image i, and the process proceeds to Step S2405.

The size Pij of the lesion can be calculated in accordance with the following expression by using the lesion size information 2203 included in the accompanying information and the setting information concerning the paging image reading retained in the display setting information storage unit 2103.

$Pij(mm^2)$=(vertical size of lesion×display magnification of image×pixel pitch(mm/pixel))×(lateral size of lesion×display magnification of image× pixel pitch(mm/pixel))

For example, in the fourth embodiment of the present invention, the size Pij of the lesion in the tomographic image of Image ID 8 can be calculated to be 1.5625 $mm^2$ in accordance with the following expression. In this procedure, it is assumed that the display magnification is ×1 magnification.

$Pij(mm^2)$=(5×1×0.25)×(5×1×0.25)

When the type information 2201 of the lesion is "absent" as in Image ID 1, Pij is 0.

In Step S2405, the entire lesion size calculating unit 2105 judges whether or not the lesion, for which the size has been calculated in S2404 described above, is the same lesion as the lesion photographed in the previous tomographic image (i−1). If the lesion is identical, the process proceeds to S2407. If the lesion is different, the process proceeds to S2406.

The following judging method is available to judge whether or not the lesions, which are photographed in the two adjoining tomographic images, are identical with each other. That is, for example, it is possible to judge whether or not the lesion of the same type as the type of the lesion existing in the previous tomographic image is present by using the type information 2201 of the lesion of the accompanying information. If the type information 2201 of the lesion is identical, it is judged whether or not a portion, in which the existing regions of the lesions are overlapped with each other, is present, from the position coordinate information 2202 of the lesion and the size information 2203 of the lesion. If at least parts of the lesions are overlapped with each other, the lesions are dealt with as the same lesion.

In the fourth embodiment of the present invention, for example, the entire lesion size calculating unit 2105 proceeds to S2406 in relation to Image ID 8. The entire lesion size calculating unit 2105 judges that the same lesion is present in relation to Image ID's 9, 10, 11 to proceed to S2407.

In Step S2406, the entire lesion size calculating unit 2105 retains the following information with new different variables as the lesion different from the lesion existing in the previous tomographic image, and the process proceeds to S2408.

Entire lesion size=size *Pij* of lesion calculated in S2404 described above

Number of sequential image=1 image

Lesion start tomographic image ID=*i*

For example, in the fourth embodiment of the present invention, the following information is retained with new different variables in relation to the lesion included in the tomographic image of Image ID 8.

Entire lesion size=1.5625 $mm^2$

Number of sequential image=1

Lesion start tomographic image ID=8

In Step S2407, the entire lesion size calculating unit 2105 adds and retains the following information with respect to the variables retained in S2406 described above in relation to the same lesion of the previous tomographic image (i−1) as the same lesion as the lesion existing in the previous tomographic image, and the process proceeds to S2408.

Entire lesion size+=size *Pij* of lesion calculated in S2404 described above

Number of sequential image=1 image

For example, in the fourth embodiment of the present invention, the values are added to the variables retained for Image ID 8, in relation to Image ID's 9, 10, 11. As a result, in the case of the tomographic image 11, the entire lesion size, the number of sequential images, and the lesion start tomographic image ID are as follows in relation to the lesion "calcification".

Entire lesion size=25.875 $mm^2$

Number of sequential images=4 images

Lesion start tomographic image ID=8

In Step S2410, the entire lesion size calculating unit 2105 outputs, as the output information, the result of the analysis of the lesion performed for all of the tomographic images, and the process is completed. The output information is the information in which the lesion start image ID, the number of sequential images N, and the entire lesion size H are described, for example, as shown in FIG. 25.

(Explanation of Process Flow of Image Play Speed Deciding Unit 2106)

Figure 26:
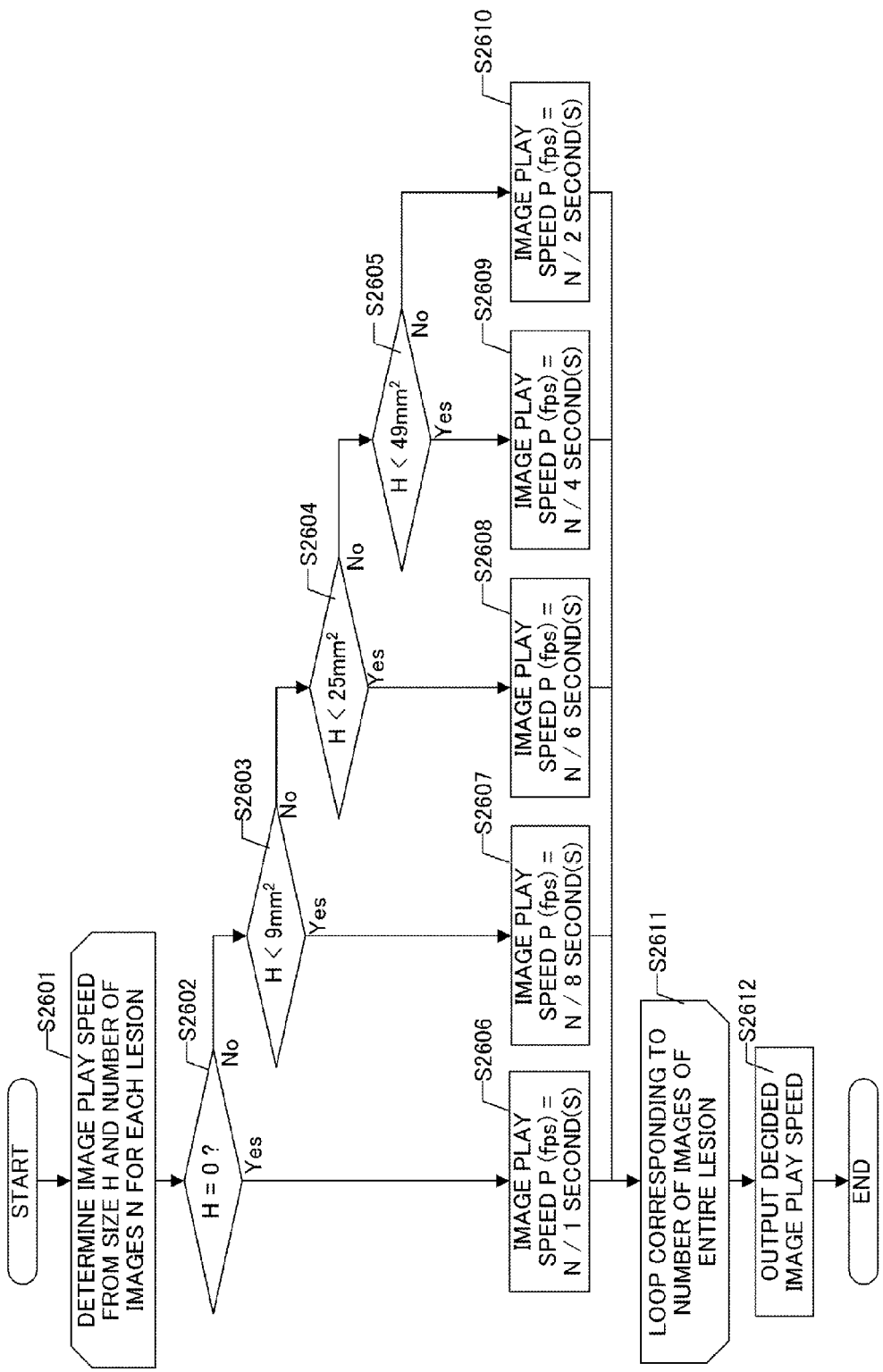
FIG. 26 shows an operation flow of an image play speed deciding unit according to the fourth embodiment.

FIG. 26 shows a process flow of the image play speed deciding unit 2106. The image play speed deciding unit 2106 repeatedly performs the processes ranging from Step S2602 to Step S2611 for every 1 one line in relation to the output information fed from the entire lesion size calculating unit 2105 described above.

In Step S2602, if the entire lesion size H (mm²) of the output information is 0, the image play speed deciding unit 2106 proceeds to Step S2606. In this procedure, the image play speed deciding unit 2106 calculates the image play speed P in accordance with the following expression from the number of sequential images N and the image play speed determining table (FIG. 23) retained in the speed determination information storage unit 2104.

$$P(\text{fps}) = \text{number of sequential images } N(\text{images})/\text{total number of display second(s)}(s)$$

For example, in the fourth embodiment of the present invention, the image play speed P is 7 fps for the lesion of the lesion start image ID 1 (type of lesion: absent). If the entire lesion size H (mm²) has any value other than 0, the image play speed deciding unit 2106 proceeds to Step S2603.

In Step S2603, if the entire lesion size H (mm²) fulfills H<9, the image play speed deciding unit 2106 proceeds to Step S2607. The image play speed P is calculated from the number of sequential images N and the image play speed determining table (FIG. 23) retained in the speed determination information storage unit 2104. If the entire lesion size H (mm²) has any value other than those fulfill H<9, the image play speed deciding unit 2106 proceeds to Step S2604.

In Step S2604, if the entire lesion size H (mm²) fulfills H<25, the image play speed deciding unit 2106 proceeds to Step S2608. The image play speed P is calculated from the number of sequential images N and the image play speed determining table (FIG. 23) retained in the speed determination information storage unit 2104. If the entire lesion size H (mm²) has any value other than those fulfill H<25, the image play speed deciding unit 2106 proceeds to Step S2605.

In Step S2605, if the entire lesion size H (mm²) fulfills H<49, the image play speed deciding unit 2106 proceeds to Step S2609. The image play speed P is calculated from the number of sequential images N and the image play speed determining table (FIG. 23) retained in the speed determination information storage unit 2104. For example, in the fourth embodiment of the present invention, the image play speed P is 1 fps for the four sequential tomographic images starting from the lesion start image ID 8. If the entire lesion size H (mm²) has any value other than those fulfill H<49, the image play speed deciding unit 2106 proceeds to Step S2610. The image play speed P is calculated from the number of sequential images N and the image play speed determining table (FIG. 23) retained in the speed determination information storage unit 2104.

In Step S2612, the image play speed deciding unit 2106 outputs the calculated image play speed of each of the tomographic image data as the image play speed information as shown in FIG. 27, and the process is completed. In the fourth embodiment of the present invention, the image play speed information is stored in the image data storage unit 2107 together with the tomographic image data.

(Explanation of Process Flow of Display Control Unit 2108)

Figure 28:
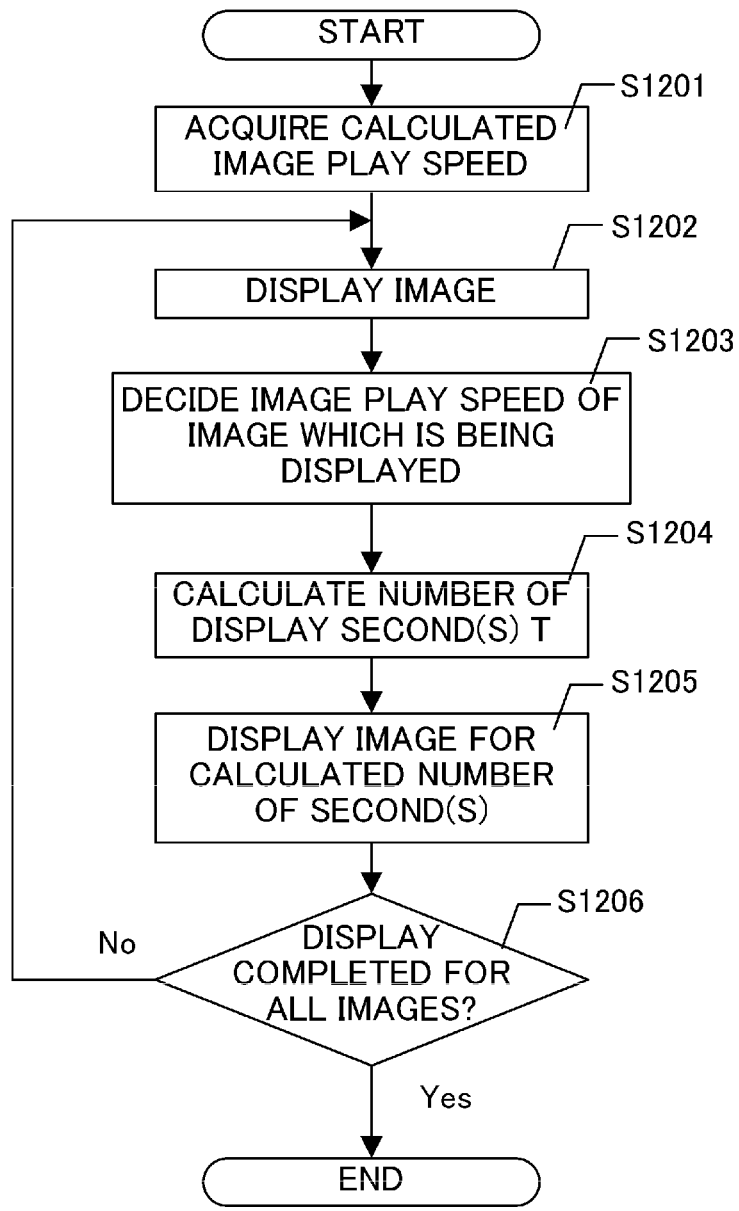
FIG. 28 shows an operation flow of a display control unit according to the fourth embodiment.

FIG. 28 shows a process flow of the display control unit 2108.

In Step S1201, the display control unit 2108 acquires all of M images of the tomographic image data and the image play speed information (FIG. 27) from the image data storage unit 2107 upon the start of the paging image reading, and the process proceeds to Step S1202.

In Step S1202, the display control unit 2108 sends the tomographic image data to the display unit 2109 to display the tomographic image, and the process proceeds to Step S1203.

In Step S1203, the display control unit 2108 decides the image play speed on the basis of the image play speed shown in FIG. 27 and ID of the tomographic image which is being displayed at present, and the process proceeds to Step S1204. For example, in the fourth embodiment of the present invention, the image play speed of Image ID 1 is, for example, 7 fps.

In Step S1204, the display control unit 2108 calculates the display time T of the tomographic image data which is being displayed in accordance with the following expression, from the image play speed, and the process proceeds to Step S1205.

$$\text{Display time } T(s) \text{per one image} = 1/\text{image play speed (fps)}$$

For example, Image ID 1 shown in FIG. 27 has the image play speed of 7 fps, and hence the number of display second(s) is 0.14 second. Further, Image ID 8 has the image play speed of 1 fps, and hence the number of display second(s) is 1 second.

In Step S1205, the display control unit 2108 performs the control so that the tomographic image data, which is being displayed, is sequentially displayed for the calculated number of display second(s), and then the process proceeds to Step S1206.

In Step S1206, the display control unit 2108 judges whether or not all of the M images of the tomographic image data are displayed. If all of the images are displayed, the paging image reading process is completed. If all of the images of the tomographic image data are not displayed, the display control unit 2108 repeats the processes ranging from Step S1202 to Step S1206 in relation to the next tomographic image data.

Figure 29:
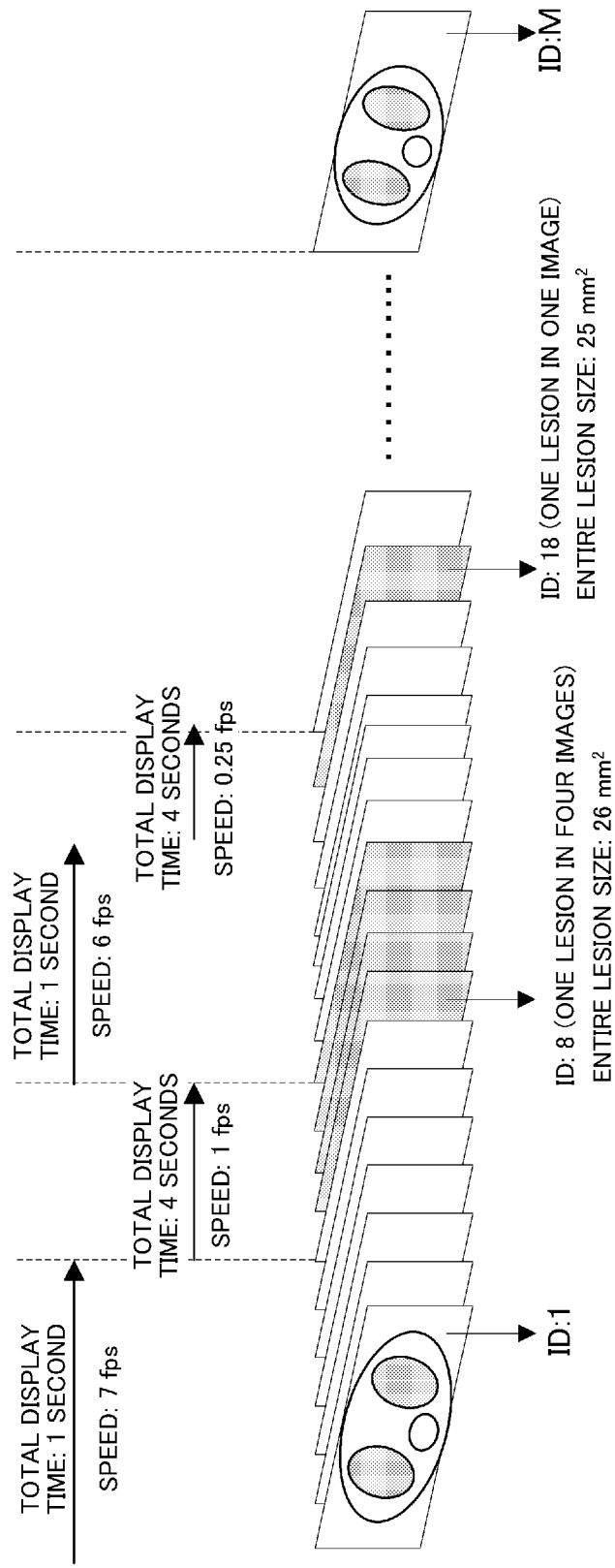
FIG. 29 shows exemplary image play speeds during the paging image reading according to the fourth embodiment.

FIG. 29 shows an exemplary drawing illustrating the transition or change of the image play speed provided when the tomographic image data 203 is subjected to the paging image reading according to the fourth embodiment of the present invention. The total display time is identical according to the entire lesion size in relation to the lesion of Image ID 8 to ID 11 and the lesion of Image ID 18. Therefore, the image play speed is retarded (slowed down) for Image ID 18 wherein the number of image(s) in which the lesion is photographed is smaller.

Figure 30:
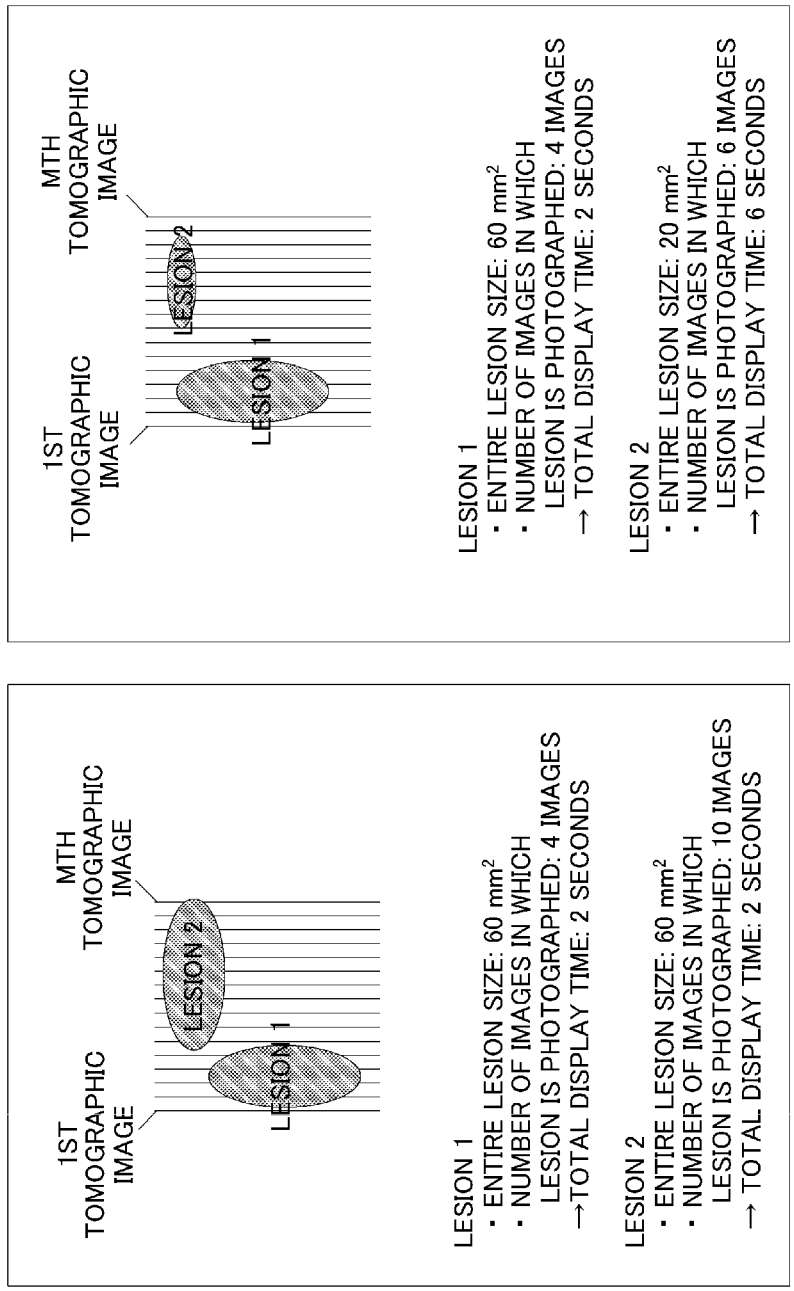
FIGS. 30A and 30B illustrate the entire lesion size and the number of images according to the fourth embodiment.

As described above, according to the present invention, the total display time is decided in accordance with the entire lesion size, and the image play speed is calculated during the paging image reading on the basis of the number of image(s) in which the lesion is photographed. Therefore, the total display time is not prolonged, which would be otherwise prolonged in proportion to the number of image(s). It is possible to suppress any unnecessary prolongation of the image reading time. In other words, according to the present invention, as shown in FIG. 30A, as for the lesions in which the entire lesion size is identical, the same total display time is provided even if the number of image(s) in which the lesion is photographed is large or small. On the other hand, as shown in FIG. 30B, the total display time is prolonged for the lesion in which the entire lesion size is small, in order to reduce or lessen the oversight of the lesion.

In the fourth embodiment of the present invention, the exemplary case is used, in which the image play speed does not depend on the type of the lesion. However, as shown in FIG. 31, it is also appropriate to prepare an image play speed determining table in which the type of the lesion is taken into consideration. Accordingly, even when the entire lesion size is identical, it is possible to change the image play speed depending on the type of the lesion. It is possible to further improve the image reading efficiency of the user.

The fourth embodiment of the present invention has been explained by using the exemplary case in which the information about the resolution (number of pixels) of the display unit 2109 and the pixel pitch per 1 pixel is retained in the display setting information storage unit 2103, and the entire lesion size calculating unit 2105 acquires the information from the display setting information storage unit 2103. However, the entire lesion size calculating unit 2105 may acquire the information from the display unit 2109, for example, in accordance with EDID (Extended Display Identification Data).

The fourth embodiment of the present invention has been explained by using the exemplary case in which the image accompanying information (FIG. 22A) is present. However, if the lesion information is absent in (not accommodated with) the image, the position and the size of the lesion in the image may be calculated by using the DICOM standard as the medical image format. The type, the position coordinate, and the size of the lesion in the image may be decided by means of the image analysis.

The fourth embodiment of the present invention has been explained while separating the image data storage unit 2107, the display setting information storage unit 2103, and the speed determination information storage unit 2104. However, it is also appropriate to adopt the construction in which the pieces of information stored in these units are stored in an identical storage unit.

Fifth Embodiment

In a fifth embodiment of the present invention, an explanation will be made about an exemplary case in which when an identical lesion is photographed or picked up over a plurality of tomographic images, the control is performed such that the display period of a specified tomographic image is allowed to differ from the display periods of the other tomographic images. The construction of the medical image display apparatus 103 is the same as that of the fourth embodiment, but the processes of the entire lesion size calculating unit 2105 and the image play speed deciding unit 2106 are different. Any detailed explanation will be omitted for the same portions as those of the fourth embodiment, and an explanation will be principally made about the difference.

(Explanation of Process Flow of Entire Lesion Size Calculating Unit 2105)

Figure 32:
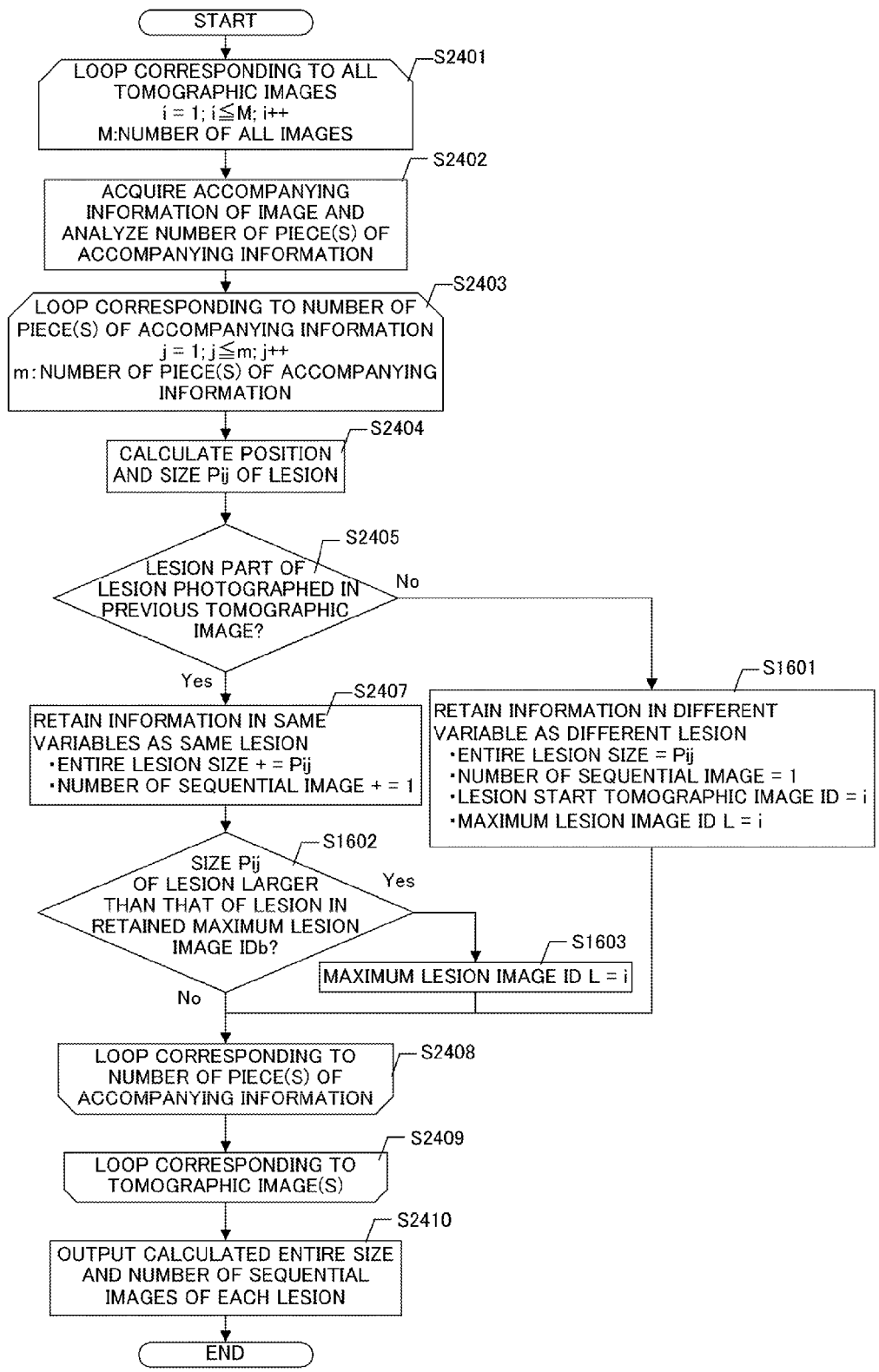
FIG. 32 shows an operation flow of an entire lesion size calculating unit according to a fifth embodiment.

FIG. 32 shows a process flow of the entire lesion size calculating unit 2105. In FIG. 32, the steps, which have the same contents as those of the flow shown in FIG. 24 of the fourth embodiment, are designated by the same reference numerals as those in FIG. 24.

In Step S2405, the entire lesion size calculating unit 2105 judges whether or not the lesion, for which the size has been calculated in S2404, is the same lesion as the lesion photographed in the previous tomographic image (i−1). If the lesion is different, the process proceeds to S1601. In Step S1601, the entire lesion size calculating unit 2105 retains the present tomographic image ID as the maximum lesion image ID, and the process proceeds to S2408 to repeatedly perform the processes ranging from S2403 to S2408. For example, in the fifth embodiment of the present invention, in the case of Image ID 8 shown in FIG. 22A, 8 is retained for the maximum lesion image ID.

On the other hand, in Step S2405, if the lesion is the same as the lesion j photographed in the previous tomographic image i, then the entire lesion size calculating unit 2105 proceeds to S2407, and then the entire lesion size calculating unit 2105 proceeds to S1602. In this procedure, the entire lesion size calculating unit 2105 judges whether or not the size Pij of the lesion calculated in S2404 is larger than the size of the lesion in the retained maximum lesion image ID. If the size Pij of the lesion calculated in S2404 is larger, the entire lesion size calculating unit 2105 retains the present tomographic image ID for the maximum lesion image ID in S1603. For example, in the fifth embodiment of the present invention, the lesion in Image ID 10 shown in FIG. 22A is larger than the lesion in Image ID 9. Therefore, Image ID 10 is retained for the maximum lesion image ID.

In Step S2410, the entire lesion size calculating unit 2105 outputs, as the output information, the result of the analysis of the lesion performed for all of the tomographic images, and the process is completed. As shown in FIG. 33, exemplary output information is information in which the maximum lesion image IDL is added to the output information of the fourth embodiment.

(Explanation of Process Flow of Image Play Speed Deciding Unit 2106)

Figure 34:
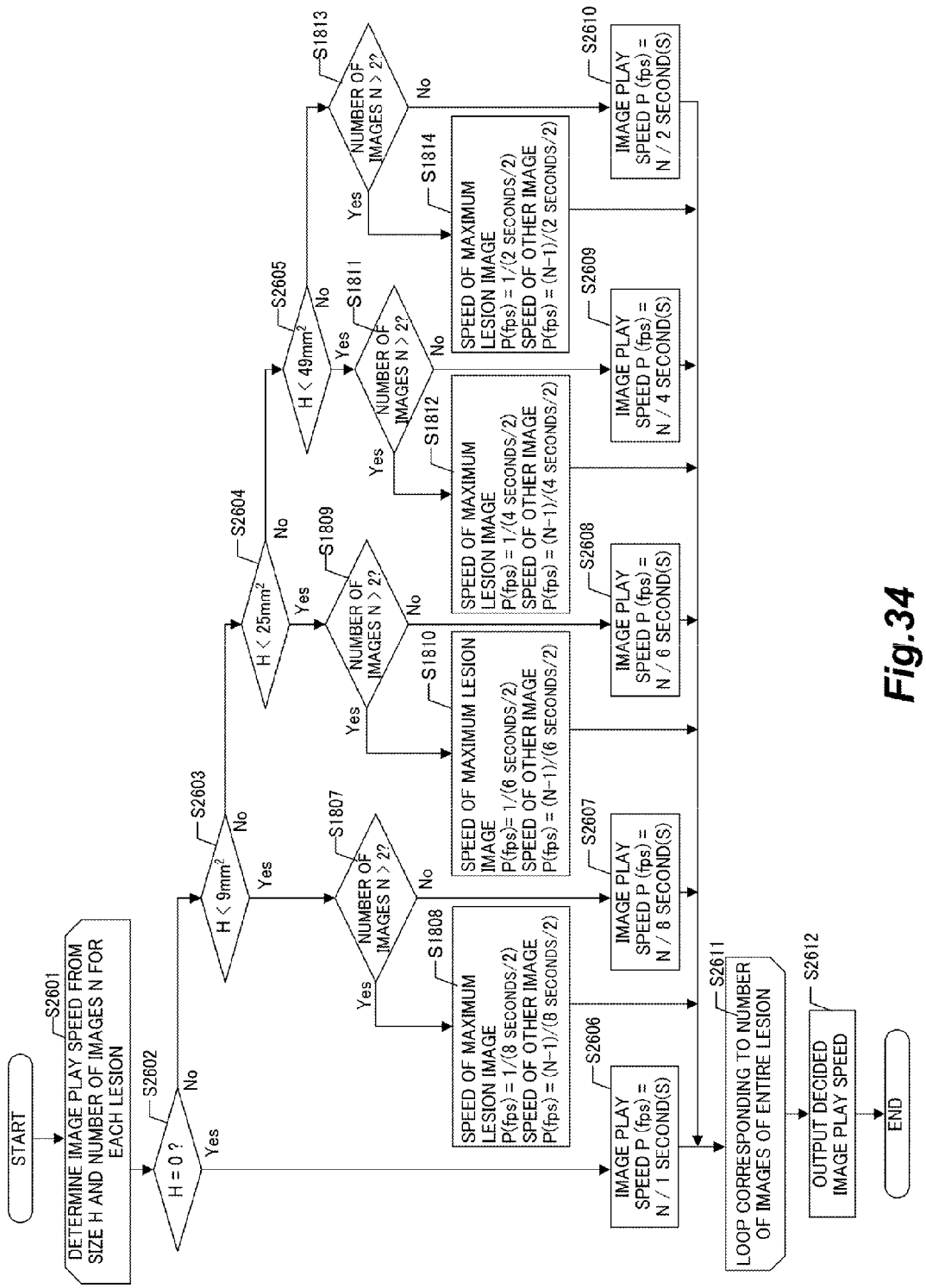
FIG. 34 shows an operation flow of an image play speed deciding unit according to the fifth embodiment.

FIG. 34 shows a process flow of the image play speed deciding unit 2106 according to the fifth embodiment. In FIG. 34, the steps, which have the same contents as those of the flow shown in FIG. 26 of the fourth embodiment, are designated by the same reference numerals as those in FIG. 26.

In Step S1807, the image play speed deciding unit 2106 judges whether or not the number of sequential images N is larger than 2. If the number of sequential images N is larger than 2, the process proceeds to S1808 to calculate the image play speed of the maximum lesion image and the image play speed of the other image in accordance with the following expressions. As for the total number of display second(s), the image play speed deciding unit 2106 acquires the concerning time from the image play speed determining table (FIG. 23) retained in the speed determination information storage unit 2104.

$$\text{Image play speed of maximum lesion image} = 1/(\text{total number of display second(s)})/2)$$

$$\text{Image play speed of other image} = (N-1)/(\text{total number of display second(s)})/2)$$

The judgment process, which is the same as or equivalent to that of S1807, is adopted in relation to S1809, S1811, and S1813, and hence any description thereof is omitted. Further, the process, which is the same as or equivalent to that of S1808, is adopted in relation to S1810, S1812, and S1814, and hence any description thereof is omitted.

For example, in the fifth embodiment of the present invention, the image play speed of Image ID 10 is 0.5 fps, and the image play speeds of the other image ID's 8, 9, 11 are 1.5 fps, in relation to the four images of the image group (ID's 8, 9, 10, 11) having the lesion start image ID 8 as shown in FIG. 33.

In Step S2612, the image play speed deciding unit 2106 outputs the calculated image play speed of each of the tomographic images as the image play speed information as shown in FIG. 35, and the process is completed.

The process flow of the display control unit 2108 is the same as or equivalent to that of the fourth embodiment, and hence any explanation thereof is omitted.

Figure 36:
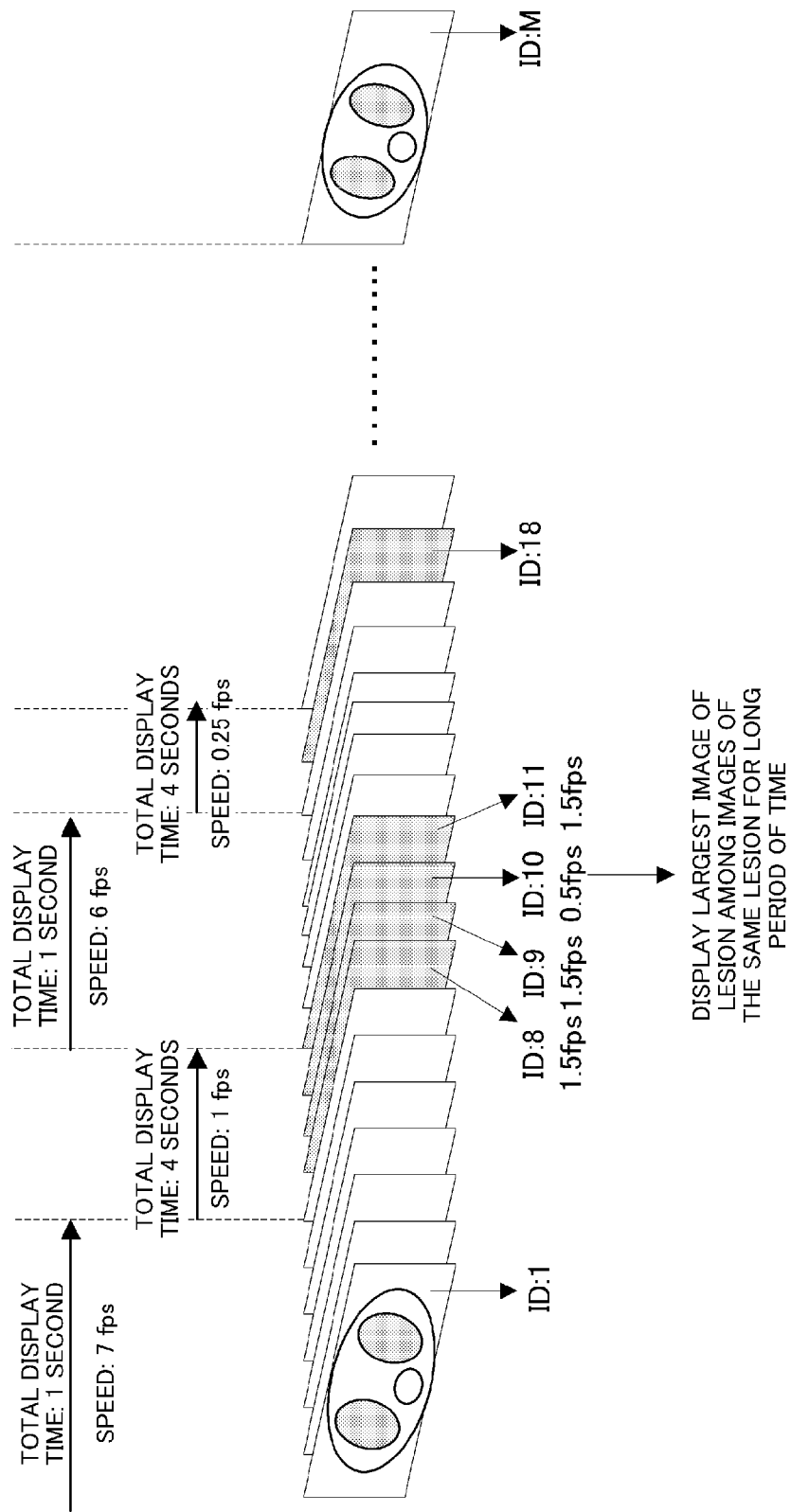
FIG. 36 shows exemplary image play speeds during the paging image reading according to the fourth embodiment.

FIG. 36 shows an exemplary drawing illustrating the transition or change of the image play speed provided when the tomographic image data 203 is subjected to the paging image reading according to the image play control concerning the fifth embodiment of the present invention. As shown in FIG. 36, the image, which is included in the same lesion images and which has the lesion photographed most largely, is displayed for a longer period of time as compared with the other images.

As described above, the image, in which the lesion is photographed in the largest size, is displayed for the longest period of time, in the predetermined total display time to display the plurality of images when the lesion is photographed consecutively in the plurality of images. Accordingly, it is possible to reduce the oversight of the lesion within the restricted image reading time.

The explanation has been made in the fifth embodiment of the present invention about the exemplary case wherein the image, in which the lesion is photographed in the largest size, is displayed for the longer period of time. However, it is also appropriate that the lesion start image is displayed for a long period of time. The explanation has been made in the fifth embodiment of the present invention about the exemplary case wherein the time, which is ½ of the total display time, is allotted to the display of the maximum lesion image. However, the ratio, which is allotted to the display of the maximum lesion image, is not limited to ½. If the time, which is 1/A of the total display time, is allotted to the display of the maximum lesion image, the following expressions are given.

Image play speed of maximum lesion image=1/(total number of display second(s))/$A$)

Image play speed of other image=($N$–1)/(total number of display second(s))/$A$)

The explanation has been made in the fifth embodiment of the present invention about the exemplary case wherein the present invention is applied to the control of the display apparatus for the medical image. However, the present invention is not limited to the display control for the medical image. The present invention is generally applicable to any display apparatus for displaying a tomographic image group of a test object. The present invention is applicable to the control of the image play speed when an object, which exists in a test object, is consecutively photographed in a plurality of tomographic images.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178637, filed on Aug. 10, 2012, and Japanese Patent Application No. 2012-178638, filed on Aug. 10, 2012, which are hereby incorporated by reference herein in their entirety.

What is claimed is:

1. A display control apparatus for performing display control in order to display an image on a display apparatus, the display control apparatus comprising:

an input unit configured to input image group data composed of a plurality of images to be sequentially played;

an acquiring unit configured to acquire information of a display size of a specific object included in each of the images; and a determining unit configured to determine a play speed at which each of the plurality of images is sequentially played in accordance with the display size of the specific object included in each of the images, wherein said determining unit is configured to determine the play speed so that the smaller the display size of the specific object is, the slower the play speed is.

2. The display control apparatus according to claim 1, wherein the image group data has accompanying information which includes information of a size of the specific object included in each of the images, and said acquiring unit acquires information of the display size of the specific object from the accompanying information.

3. The display control apparatus according to claim 2, wherein, the accompanying information includes the size of the specific object as information of a number of pixels, and said acquiring unit acquires information of a pixel pitch of the display apparatus and calculates the display size of the specific object from the information of the pixel pitch and the number of pixels of the specific object acquired from the accompanying information.

4. The display control apparatus according to claim 1, wherein said acquiring unit acquires information of a size, a type, and a position coordinate of the specific object included in the image by means of image analysis for the image.

5. The display control apparatus according to claim 1, further comprising:

a storage unit configured to store information of a predetermined correlation between the display size of the specific object and the play speed, wherein said determining unit determines the play speed corresponding to the display size of the specific object on the basis of the correlation.

6. The display control apparatus according to claim 5, wherein the correlation is determined so that the play speed of the image, in which the specific object is not included, is the fastest.

7. The display control apparatus according to claim 5, wherein a user can set a reference play speed in relation to the correlation.

8. The display control apparatus according to claim 5, wherein said storage unit stores the different correlations for respective types of the specific object.

9. The display control apparatus according to claim 1, wherein, the image is a tomographic image of a test object, and said acquiring unit calculates, on the basis of a predetermined correlation between a pixel value of the tomographic image and a characteristic value of the test object, the display size of the specific object included in the tomographic image from a number of pixels which exist consecutively and whose characteristic value falls within a predetermined range.

10. A control method for controlling a display apparatus for performing display control in order to display an image on the display apparatus, the control method comprising:

inputting image group data composed of a plurality of images to be sequentially played;

acquiring information of a display size of a specific object included in each of the images; and determining a play speed at which each of the plurality of images is sequentially played one by one in accordance with the display size of the specific object included in each of the images, wherein the play speed is determined so that the smaller the display size of the specific object is, the slower the play speed is.

11. A display control apparatus for performing display control in order to display an image on a display apparatus, the display control apparatus comprising:

an input unit configured to input image group data composed of a plurality of images to be sequentially played;

an acquiring unit configured to acquire information of a display size of a specific object included in each of the images; and a determining unit configured to determine a play speed at which each of the images is sequentially played one by one in accordance with an entire size obtained by totalizing the display sizes of the specific object included in the respective images and a number of the images in which the specific object is included.

12. The display control apparatus according to claim 11, wherein, the image group data has accompanying information which includes information of a size of the specific object included in each of the images, and said acquiring unit acquires information of the display size of the specific object from the accompanying information.

13. The display control apparatus according to claim 12, wherein, the accompanying information includes the size of the specific object as information of a number of pixels, and said acquiring unit acquires information of a pixel pitch of the display apparatus and calculates the display size of the specific object from the information of the pixel pitch and the number of pixels of the specific object acquired from the accompanying information.

14. The display control apparatus according to claim 12, wherein, the accompanying information further includes information of a type and a position coordinate of the specific object included in each of the images, and the entire size is calculated by totalizing the display size of the specific object in each of successive images of which the type of the specific object included therein is identical with each other and of which the existence region of the specific object included therein is overlapped at least partially with each other.

15. The display control apparatus according to claim 11, wherein said acquiring unit acquires information of a size, a type, and a position coordinate of the specific object included in the image by means of image analysis for the image.

16. The display control apparatus according to claim 11, further comprising:

a storage unit configured to store information of a predetermined correlation between the entire size of the specific object and a display period, wherein said determining unit determines the display period corresponding to the entire size of the specific object on the basis of the correlation and calculates the play speed by dividing, by the display period, the number of the images in which the specific object is included.

17. The display control apparatus according to claim 16, wherein the correlation is determined so that the smaller the entire size of the specific object is, the longer the display period is.

18. The display control apparatus according to claim 16, wherein said storage unit stores the different correlations for respective types of the specific object.

19. The display control apparatus according to claim 11, wherein said determining unit prolongs the display period of a specified image of the plurality of images as compared with the display periods of the other images, if the identical specific object is included in the plurality of images.

20. The display control apparatus according to claim 19, wherein the specified image is a tomographic image which is included in the plurality of images and which has the largest display size of the specific object.

21. A control method for controlling a display apparatus for performing display control in order to display an image on the display apparatus, the control method comprising:

inputting image group data composed of a plurality of images to be sequentially played;

acquiring information of a display size of a specific object included in each of the images; and determining a play speed at which each of the images is sequentially played in accordance with an entire size obtained by totalizing the display sizes of the specific object included in the respective images and a number of the images in which the specific object is included.

* * * * *